US012332037B2

(12) United States Patent
Adasczik et al.

(10) Patent No.: US 12,332,037 B2
(45) Date of Patent: Jun. 17, 2025

(54) SWITCH ASSEMBLY

(71) Applicant: BAE Systems Information and Electronic Systems Integration Inc., Nashua, NH (US)

(72) Inventors: Walter K. Adasczik, Nashua, NH (US); Jeffrey A. Lizotte, Dracut, MA (US); Peter H. Remeis, Pelham, NH (US); Nicholas Collard, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 330 days.

(21) Appl. No.: 17/858,432

(22) Filed: Jul. 6, 2022

(65) Prior Publication Data

US 2024/0011751 A1 Jan. 11, 2024

(51) Int. Cl.

*F42C 15/21* (2006.01)
*H01H 3/32* (2006.01)
*H01H 9/02* (2006.01)

(52) U.S. Cl.

CPC ............... *F42C 15/21* (2013.01); *H01H 3/32* (2013.01); *H01H 9/02* (2013.01)

(58) Field of Classification Search

CPC .. H01H 3/32; H01H 3/54; H01H 9/02; H01H 9/20; H01H 9/22; H01H 1/18; H01H 1/36; F42C 15/21
USPC ........................................................ 200/50.01
See application file for complete search history.

(56) References Cited

U.S. PATENT DOCUMENTS

| | | | |
|---|---|---|---|
| 4,091,710 | A | 5/1978 | Lienau et al. |
| 4,417,498 | A | 11/1983 | Dissmeyer et al. |
| 9,136,543 | B2 | 9/2015 | Nam et al. |
| 10,290,852 | B2 | 5/2019 | Kim et al. |

FOREIGN PATENT DOCUMENTS

| | | | |
|---|---|---|---|
| EP | 2516206 | B1 | 3/2020 |
| GB | 2204734 | A | 11/1988 |
| GB | 2311408 | A | 9/1997 |
| GB | 2561263 | A | 10/2018 |
| WO | 2011077214 | A1 | 6/2011 |
| WO | 2012047291 | A1 | 4/2012 |
| WO | 2013144955 | A2 | 10/2013 |
| WO | 2013144955 | A3 | 10/2013 |
| WO | 2017069787 | A1 | 4/2017 |

*Primary Examiner* — Anthony R Jimenez
(74) *Attorney, Agent, or Firm* — Sand, Sebolt & Wernow LPA; Gary McFaline

(57) ABSTRACT

A switch assembly and a method of effecting a battery to initiate. The switch assembly includes a support that is adapted to operably engage with a battery. The switch assembly also include a slide operably engaged with the support and moveable in a first direction relative to the support between a primed position and a released position. The switch assembly also includes a cover operably engaged with the support and enclosing the slide. The switch assembly also includes a firing pin mechanism operably engaged with the support, the slide, and the cover and moveable in a second direction relative to the slide and the support. In the switch assembly, the second direction of the firing pin mechanism is different than the first direction of the slide.

18 Claims, 17 Drawing Sheets

FIG. 9
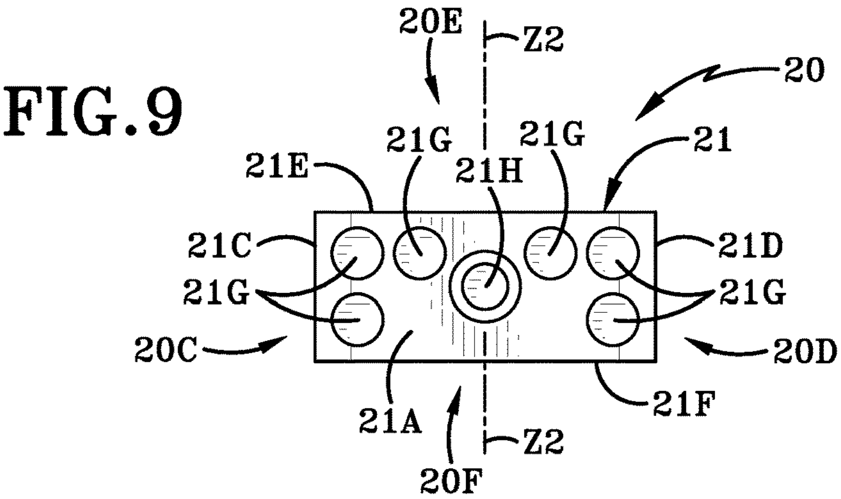
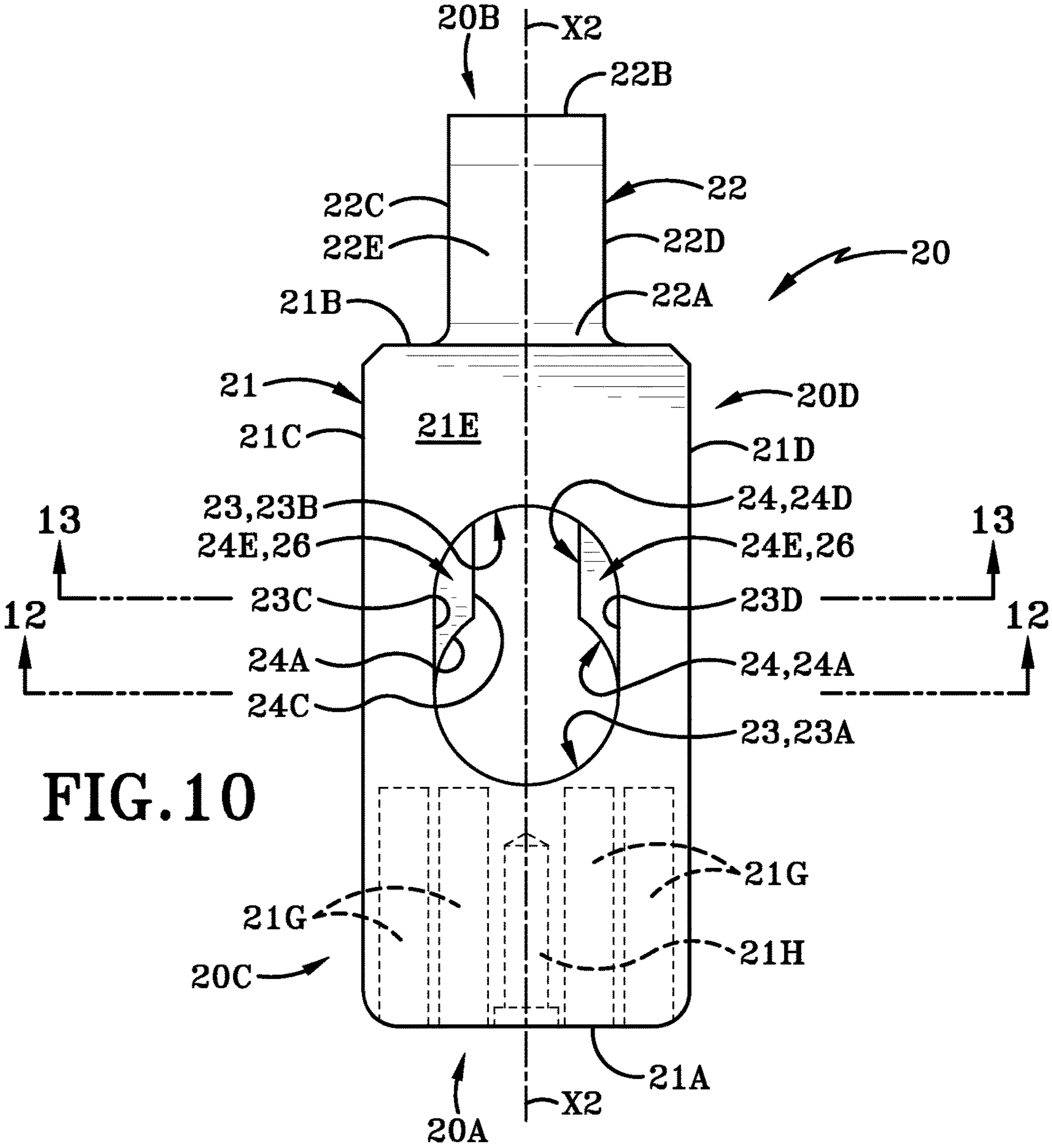
FIG. 10

SWITCH ASSEMBLY

STATEMENT OF GOVERNMENT INTEREST

This invention was made with government support under a classified contract awarded by the United States Air Force. The government has certain rights in the invention.

TECHNICAL FIELD

The present disclosure generally relates to mechanical devices for initiating operation of thermal batteries and batteries of the like.

BACKGROUND

Thermal batteries and other batteries of the like are generally used in defense vehicles (such as missiles, munitions, and other various defense vehicles currently available) for various military applications. Generally, these thermal batteries are configured to provide suitable energy to initiate and operate on-board devices and payloads that are provided with these defense vehicles. These thermal batteries must also meet various demands in order to operate during missions or operations, including suitable run-times at extended firing ranges, ballistic survivability, and environmental robustness. Generally, however, these thermal batteries must be initiated at predetermined times once these defense vehicles are launched from a platform during missions or operations.

To combat these issues, switch assemblies are generally used in these military applications to initiate operation of thermal batteries. As such, these switch assemblies are operably engaged with these thermal batteries and are housed inside of a defense vehicle. Generally, these switch assemblies include mechanisms that are configured to strike and/or ignite percussion caps provided with the thermal batteries to initiate the thermal batteries. Currently, these switch assemblies use a combination of mechanical and electrical mechanisms that work simultaneously to initiate operation of these thermal batteries at predetermined times during missions or operations. However, the combination of mechanical and electrical mechanisms of these switch assemblies may fail to initiate these thermal batteries during missions or operations due to various issues, including operation failures between the mechanical and electrical components, temperature, climate, and dynamic environments experienced by the switch assemblies, and other issues of the like. With such unreliability the mechanical and electrical mechanisms, the on-board devices and payloads operably engaged with the thermal batteries may not receive required energy at predetermined times, which leads to unsuccessful missions while using these defense vehicles.

SUMMARY

The presently disclosed switch assembly provides a defense vehicle with an apparatus that initiates operation of thermal batteries through mechanical mechanisms only. The switch assembly disclosed herein includes a firing pin mechanism that initiates a thermal battery through mechanical operations without electrical mechanism assistance. As such, the switch assembly disclosed herein addresses some of the inadequacies of previously known switch assemblies for initiating operation of thermal batteries.

In one aspect, an exemplary embodiment of the present disclosure may provide a switch assembly. The switch assembly may include a support adapted to operably engage with a battery. The switch assembly may also include a slide operably engaged with the support and moveable in a first direction relative to the support between a primed position and a released position. The switch assembly may also include a cover operably engaged with the support and enclosing the slide. The switch assembly may also include a firing pin mechanism operably engaged with the support, the slide, and the cover and moveable in a second direction relative to the slide and the support, wherein the second direction is different than the first direction.

This exemplary embodiment or another exemplary embodiment may further include that the firing pin mechanism is provided in the loaded position when the slide is provided in the primed position; and the firing pin mechanism is provided in the fired position when the slide is provided in the released position causing the battery to initiate. This exemplary embodiment or another exemplary embodiment may further include that the support comprises: a first surface; a second surface opposite to the first surface; a cavity defined in the support extending downwardly from the first surface towards the second surface to a base wall; and a projection extending upwardly inside of the cavity from the base wall towards the first surface; wherein the cavity is configured to receive the slide; and wherein the projection is configured to receive the firing pin mechanism and to be received by the slide. This exemplary embodiment or another exemplary embodiment may further include that the slide comprises: a first end; a second end opposite to the first end; a longitudinal axis extending between the first end and the second end; and a passage defined between the first end and the second extending along an axis that is perpendicular to the longitudinal axis; wherein the passage is configured to receive the projection to enable the slide to move between the primed position and the released position. This exemplary embodiment or another exemplary embodiment may further include that the slide further comprises: a circumferential wall defining the passage; at least one shelf extending into the passage from the circumferential wall; and wherein the support further comprises: at least one slit defined in the projection configured to receive the at least one shelf of the slide. This exemplary embodiment or another exemplary embodiment may further include that the at least one shelf is positioned inside of the at least one slit when the slide is provided in the primed position; and wherein the at least one shelf is positioned outside of the at least one slit when the slide is provided in the released position. This exemplary embodiment or another exemplary embodiment may further include that the firing pin mechanism comprises: a plunger positioned inside of the projection; and a biaser operably engaged with the plunger and the cover; wherein the plunger and the biaser are provided in the loaded position when the plunger operably engages with the at least one shelf when the slide in provided in the primed position; and wherein the plunger and the biaser are provided in the fired position when the plunger operably disengages from the at least one shelf when the slide in provided in the released position. This exemplary embodiment or another exemplary embodiment may further include that the slide further comprises: at least one chamber extending from the first end towards the second end along the longitudinal axis; wherein the at least one chamber is separate from the passageway. This exemplary embodiment or another exemplary embodiment may further include at least one biaser operably engaged with the slide inside of the at least one chamber and operably engaged with the support inside of the cavity; wherein the at least one biaser is configured to move the slide in the first direction from the primed position to the released position when the slide is free from engaging a vehicle. This exemplary embodiment or another exemplary embodiment may further include a retaining member operably engaging the slide and the support with one another; wherein the retaining member maintains the slide at the primed position inside of the cavity of the support. This exemplary embodiment or another exemplary embodiment may further include that the cover comprises: a top surface; a bottom surface opposite to the top surface; and a cap extending vertically from the top surface and away from the bottom surface; wherein the cap is configured to receive and engage a portion of the biaser of the firing pin mechanism for maintaining the firing pin mechanism in the loaded position when the slide is provided in the primed position. This exemplary embodiment or another exemplary embodiment may further include that the cover further comprises: a first set of apertures defined in the cover extending entirely through the cover between the top surface and the bottom surface; and wherein the support further comprises: a first set of openings defined in the support extending into the support from the first surface towards the second surface; and wherein the switch assembly further comprising: a first set of connectors operably engaging the cover and the support with one another via the first set of apertures and the first set of openings. This exemplary embodiment or another exemplary embodiment may further include that the cover further comprises: a second set of apertures defined in the cover extending entirely through the cover between the first surface and the second surface; and wherein the support further comprises: a second set of openings defined in the support extending into the support from the first surface towards the second surface; and wherein the switch assembly further comprising: a second set of connectors adapted to operably engage the cover and the support with the battery via the second set of apertures and the second set of openings.

In another aspect, an exemplary embodiment of the present disclosure may provide a method of effecting a battery to initiate. The method comprises the steps of: engaging a slide of a switch assembly with a support of the switch assembly; loading a firing pin mechanism of the switch assembly into a projection of the support; engaging a cover of the switch assembly with the support; effecting the switch assembly to be loaded into a vehicle, wherein the slide is provided in a primed position and the firing pin mechanism is provided in a loaded position; effecting the slide to transition from the primed position to a released position; effecting the firing pin mechanism to transition from the loaded position to a fired position; and effecting the battery to initiate.

This exemplary embodiment or another exemplary embodiment may further include steps of positioning at least one shelf of the slide inside at least one slit defined by a projection of the support; and engaging a plunger of the firing pin mechanism with the at least one shelf to maintain the firing pin mechanism at the loaded position. This exemplary embodiment or another exemplary embodiment may further include a step of engaging a biaser of the firing pin mechanism with the plunger and the cover. This exemplary embodiment or another exemplary embodiment may further include a step of effecting a retaining member of the switch assembly to engage the slide and the support with one another prior to the switch assembly being loaded into a vehicle. This exemplary embodiment or another exemplary embodiment may further include a step of effecting a retaining member of the switch assembly to disengage the slide and the support from one another subsequent to the switch assembly being loaded into the vehicle. This exemplary embodiment or another exemplary embodiment may further include steps of moving the slide away from the support, via at least one biaser of the switch assembly, from the primed position to the released position; removing the at least one shelf of the slide from the at least one slit of the projection; disengaging the plunger from the at least one shelf; and moving the plunger away from the slide and the support, via the biaser of the firing pin mechanism, from the loaded position to the fired position. This exemplary embodiment or another exemplary embodiment may further include steps of effecting a first set of connectors to operably engage the cover and the support with one another via a first set of apertures defined in the cover and a first set of openings defined in the support; and effecting a second set of connectors to operably engage the cover and the support with the battery via a second set of apertures defined in the cover and a second set of openings defined in the support.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 9 (FIG. 9) is a front elevation view of the slide of the switch assembly.

FIG. 10 (FIG. 10) is a top plan view of the slide of the switch assembly.

Similar numbers refer to similar parts throughout the drawings.

DETAILED DESCRIPTION

FIGS. 1-3 and FIGS. 17-19C illustrate a switch assembly 1 that is configured to operably engage with a thermal battery or others batteries of the like. As described in more detail below, the switch assembly 1 is configured to initiate the operation of a desired thermal battery that is sized and configured to engage with the switch assembly 1. In other exemplary embodiment, any suitable battery may be operably engaged with a switch assembly described and illustrated herein in which the switch assembly is configured to initiate operation of the battery. As described in more detail below, the switch assembly 1 initiates operation of a desired thermal battery through mechanical operations performed by parts and components that form the switch assembly 1.

Figure 1:
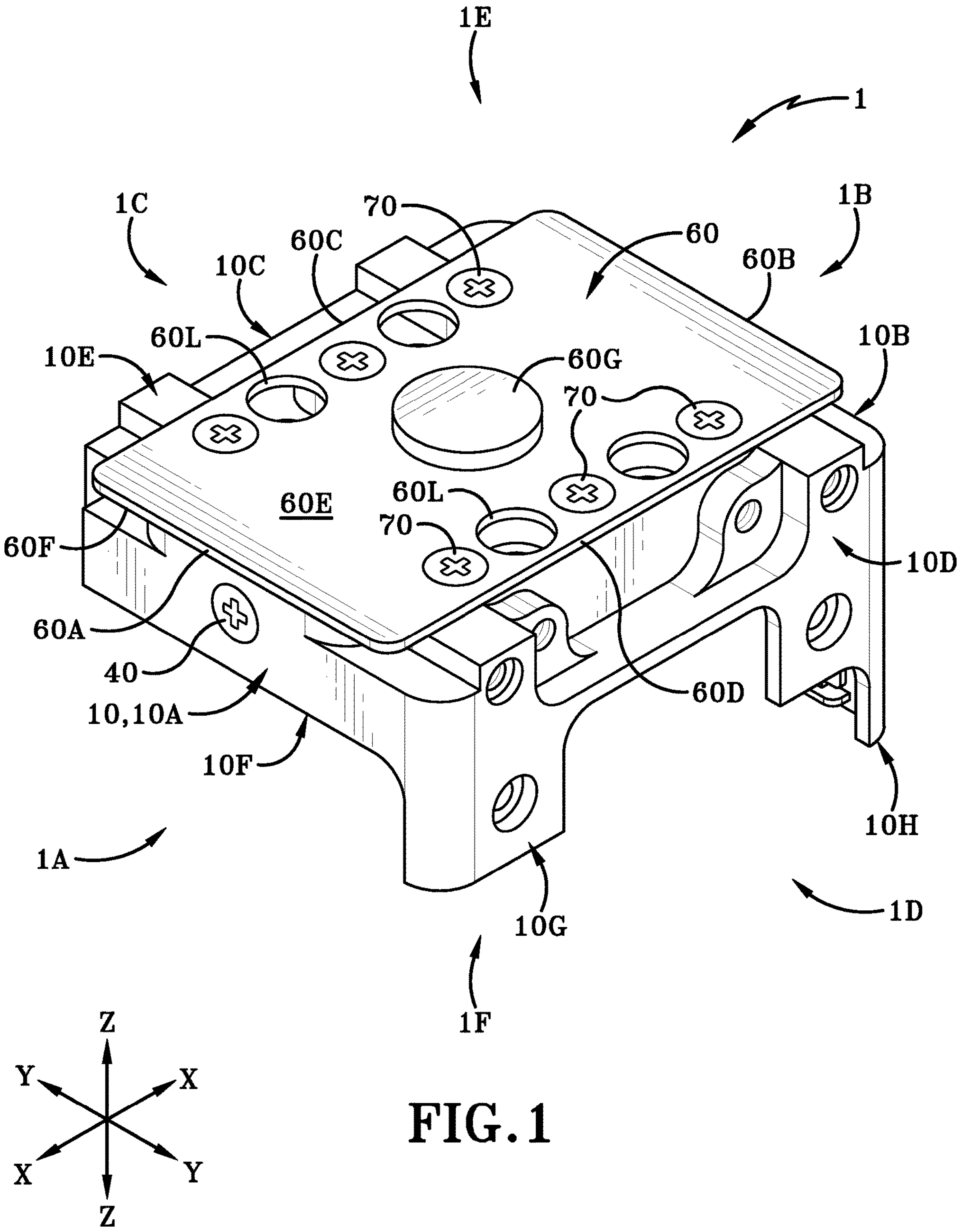
FIG. 1 (FIG. 1) is a front, top, first side isometric perspective view of a switch assembly in accordance with an aspect of the present disclosure FIG. 2 (FIG. 2) is an exploded view of the switch assembly as shown in FIG. 1, wherein a cover and a firing pin mechanism are exploded away from one another.

Referring to FIG. 1, the switch assembly 1 includes a first end 1A, a second end 1B opposite to the first end 1A, and a longitudinal axis "X" defined therebetween. The switch assembly 1 also includes a first side 1C disposed between the first end 1A and the second end 1B, a second side 1D disposed between the first end 1A and the second end 1B and opposite to the first side 1C, and a transverse axis "Y" defined therebetween. The switch assembly 1 also includes a third end 1E disposed vertically above the first end 1A, the second end 1B, the first side 1C, and the second side 1D, a fourth side 1F disposed vertically below the first end 1A, the second end 1B, the first side 1C, and the second side 1D and opposite to the third end 1E, and a vertical axis "Z" defined therebetween.

Figure 3:
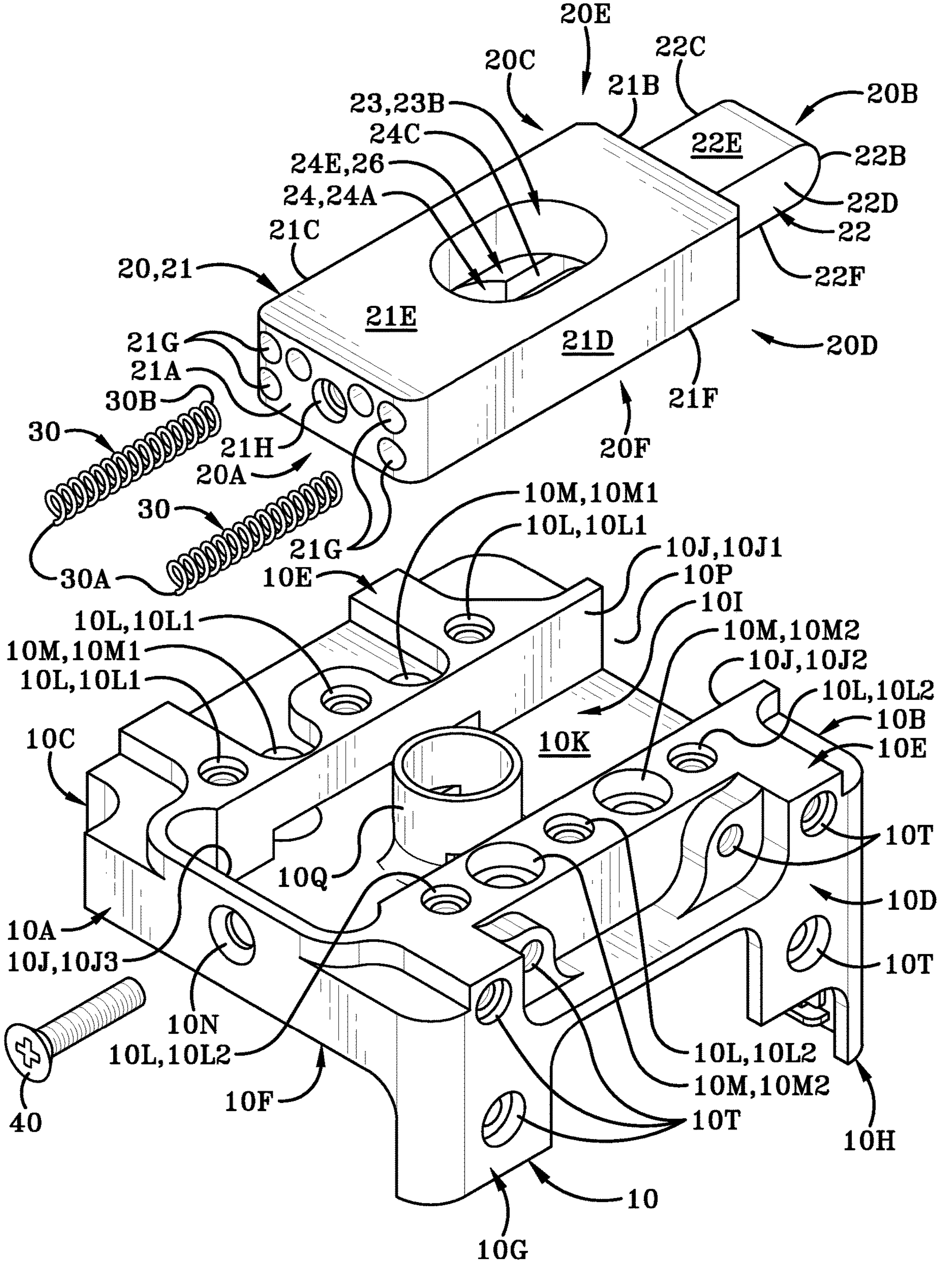
FIG. 3 (FIG. 3) is another exploded view of the switch assembly as shown in FIG. 1, wherein a support, a slide, at least one biaser, and a retaining member are exploded away from one another.
Figure 4:
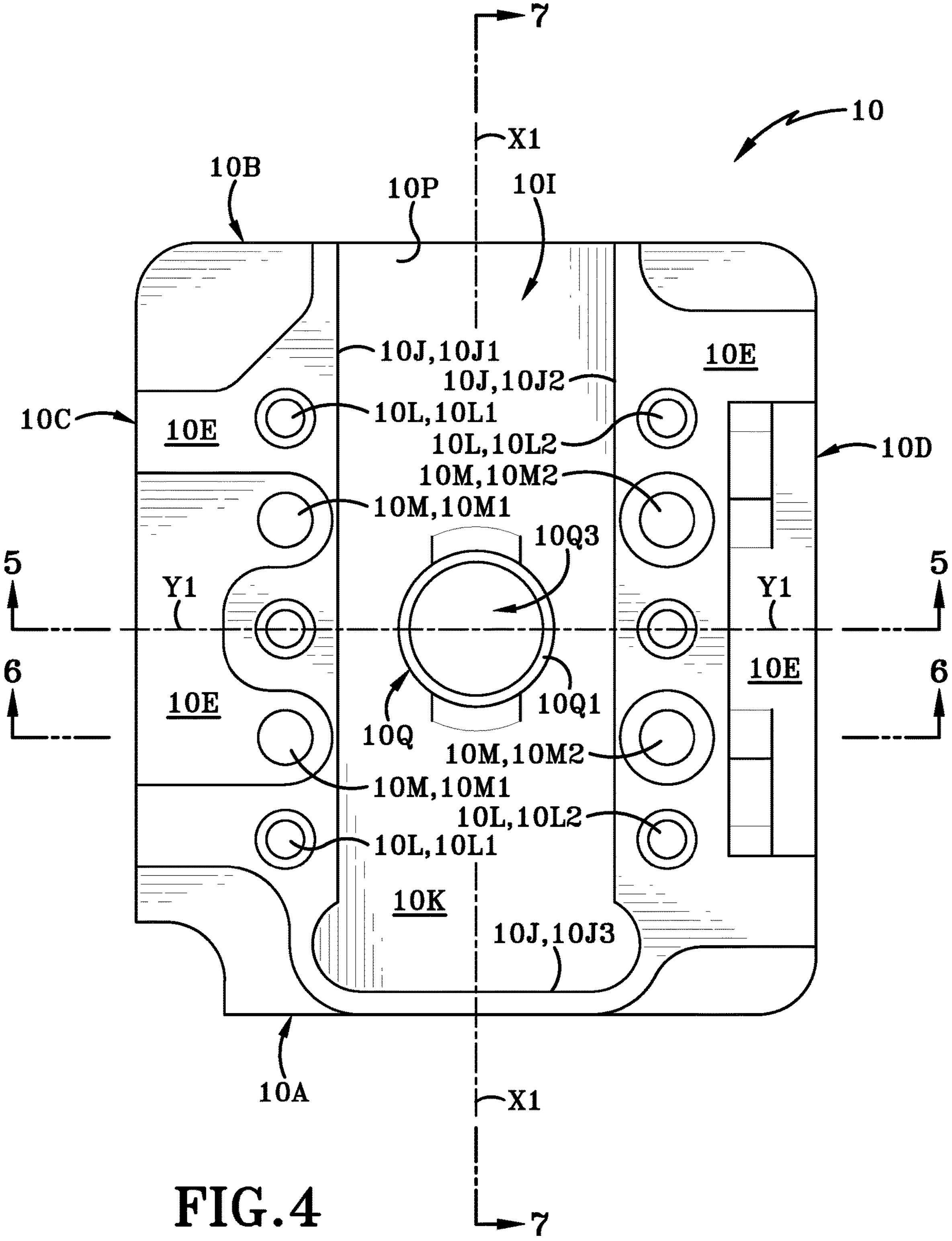
FIG. 4 (FIG. 4) is a top plan view of the support of the switch assembly.

Referring to FIG. 3, the switch assembly 1 includes a support 10. The support 10 includes a first end 10A, a second end 10B opposite to the first end 10A, and a longitudinal axis "X1" defined therebetween and parallel with the longitudinal axis "X" of switch assembly 1 (see FIG. 4). The support 10 also includes a first side 10C disposed between the first end 10A and the second end 10B, a second side 10D disposed between the first end 10A and the second end 10B and opposite to the first side 10C, and a transverse axis "Y1" defined therebetween and parallel with the longitudinal axis "Y" of switch assembly 1 (see FIG. 4). The support 10 also includes a third end 10E disposed vertically above the first end 10A, the second end 10B, the first side 10C, and the second side 10D, a fourth end 10F disposed vertically below the first end 10A, the second end 10B, the first side 10C, and the second side 10D and opposite to the third end 10E, and a vertical axis "Z1" defined therebetween and parallel with the vertical axis "Z" of switch assembly 1 (see FIG. 7).

Still referring to FIG. 3, the support 10 includes at least one extension that extends downwardly from the fourth end 10F of the support 10 proximate to at least one of the first end 10A, the second end 10B, the first side 10C, and the second side 10D. In the illustrated embodiment, the support 10 includes a first extension 10G that extends downwardly along an axis that is parallel with the vertical axis "Z1" of support 10. The first extension 10G is positioned proximate to the first end 10A of the support 10 on the second side 10D of the support 10. The support 10 also includes a second extension 10H that extends downwardly along an axis that is parallel with the vertical axis "Z1" of support 10. The second extension 10H is also positioned at the second end 10B and extends between the first side 10C and the second side 10D of the support 10. The second extension 10H is also positioned longitudinally opposite to the first extension 10G relative to the longitudinal axis "X1" of the support 10. Upon assembly, the first extension 10G and the second extension 10H may operably engage with an outer wall of a thermal battery, which is described in more detail below.

The first extension 10G and the second extension 10H may define any suitable lengths relative to one another based on various considerations, including the desired size of a thermal battery, the structural configuration of components and parts engaged with the support 10 that are separate and independent from the switch assembly 1, and other various structural configurations of the like. In the illustrated embodiment, the second extension 10H defines a greater length than the first extension 10G. In other exemplary embodiment, a first extension and a second extension of a support may define any suitable lengths relative to one another.

Still referring to FIG. 3, the support 10 also defines a cavity 101 that extends downwardly into the support 10 along the vertical axis "Z1" from the third end 10E towards the fourth end 10F. The cavity 101 is bound between an interior wall 10J that extends between the first end 10A, the first side 10C, and the second side 10D and a base wall 10K positioned vertically below the interior wall 10J extending longitudinally from the first end 10A to the second end 10B. More particularly, a first interior wall 10J1 positioned proximate the first side 10C, a second interior wall 10J2 proximate to the second side 10D, and a third interior wall 10J3 proximate to the first end 10A collectively define the interior wall 10J and bind the cavity 101. Such use and purpose of the cavity 101 is described in more detail below.

Figure 5:
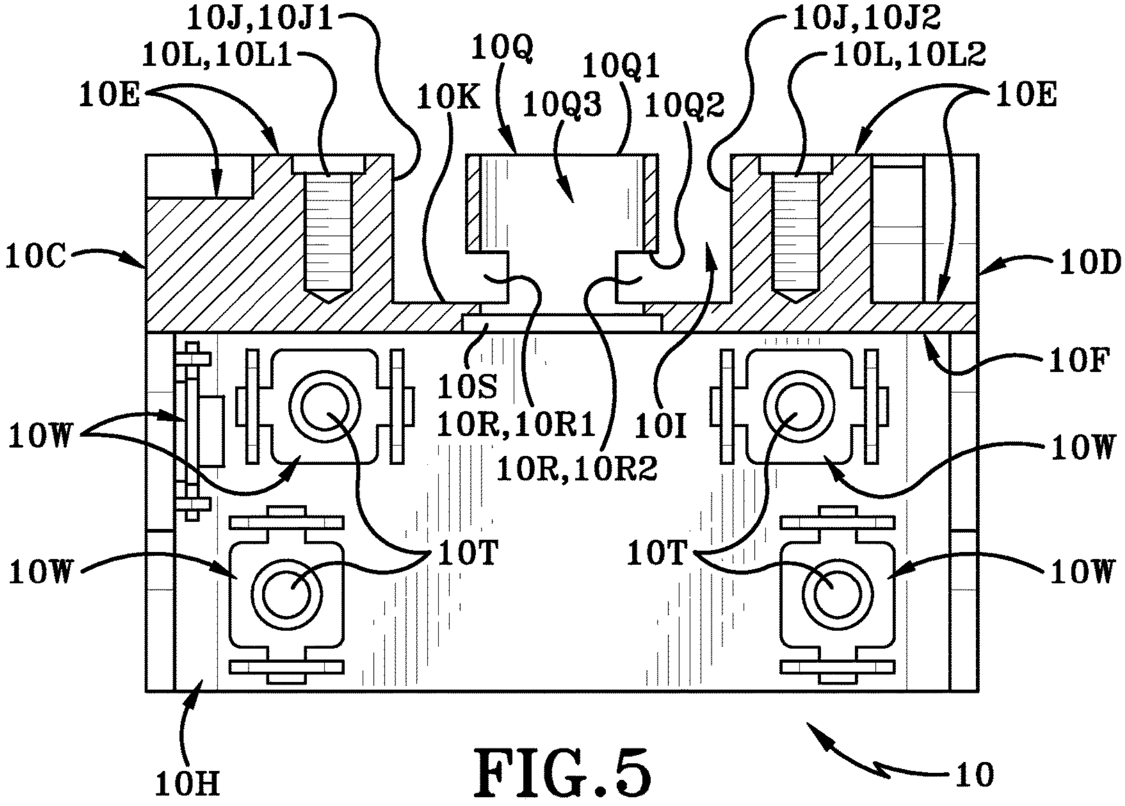
FIG. 5 (FIG. 5) is a transverse sectional view of the support taken in the direction of line 5-5 as shown in FIG. 4.

Still referring to FIG. 3, the support 10 also defines at least one set of openings. In the illustrated embodiment, the support 10 defines a first set of openings 10L where each opening of the first set of openings 10L extends downwardly through support 10 from the third end 10E towards the fourth end 10F (see FIG. 5). In the illustrated embodiment, each opening of the first set of openings 10L is recessed and/or countersunk and is threaded for receiving a connector or similar component of the like, which is described in more detail below. As illustrated in FIG. 5, each opening of the first set of openings 10L is separate and/or spaced apart from the cavity 101. As illustrated in FIG. 3, a first group of openings 10L1 from the first set of openings 10L is defined proximate to the first side 10C of the support 10, and a second group of openings from the first set of openings 10L is defined proximate to the second side 10D of the support 10 transversely opposite to the first group of openings 1011.

Still referring to FIG. 3, the support 10 also defines a second set of openings 10M where each opening of the second set of openings 10M extends downwardly through the entire support 10 from the third end 10E to the fourth end 10F (see FIG. 6); as such, the third end 10E and the fourth end 10F are in fluid communication with one another via each openings of the second set of openings 10M. In the illustrated embodiment, each opening of the second set of openings 10M is recessed and/or countersunk. In the illustrated embodiment, the second set of openings 10M is separate and/or spaced apart from the first set of openings 10L. In the illustrated embodiment, the second set of openings 10M is also separate and/or spaced apart from the cavity 101. As illustrated in FIG. 3, a first group of openings 10M1 from the second set of openings 10M is defined proximate to the first side 10C of the support 10, and a second group of openings 10M2 from the second set of openings 10M is defined proximate to the second side 10D of the support 10 transversely opposite to the first group of openings 10M1.

Still referring to FIG. 3, the support 10 also defines a through-hole 10N. In the illustrated embodiment, the through-hole 10N is countersunk and/or recessed. As illustrated, the through-hole 10N extends entirely through the interior wall 10J from the first end 10A of the support 10 to the cavity 101 (see FIG. 7). As such, the cavity 101 is in fluid communication with the exterior environment of the support 10 at the first end 10A via the through-hole 10N. Still referring to FIG. 3, the support 10 also defines an opening 10P opposite the through-hole 10N. In particular, the opening 10P is collectively defined by the interior wall 10J and the base wall 10K at the second end 10B of the support 10. As such, the cavity 101 is in fluid communication with the exterior environment of the support 10 at the second end 10B via the opening 10P.

Referring to FIGS. 3-7, the support 10 also includes a projection 10Q. As illustrated, the projection 10Q is cylindrically-shaped and extends upwardly from the base wall 10K towards the third end 10E of the support 10 along an axis that is parallel with the vertical axis "Z1" of the support 10. In the illustrated embodiment, the projection 10Q defines a top end 10Q1, a bottom end 10Q2 positioned vertically below the top end 10Q1, and a passageway 10Q3 that extends between the top end 10Q1 and the bottom end 10Q2 (see FIG. 5). As such, the passageway 10Q3 of the projection 10Q is in fluid communication with the exterior environment of the support 10 at the top end 10Q1.

The projection 10Q also defines at least one slit 10R that extends entirely through the projection 10Q along an axis that is perpendicular to a longitudinal axis of the projection 10Q parallel with the vertical axis "Z1" of support 10. In the illustrated embodiment, the projection 10Q defines a first slit 10R1 that extends through the projection 10Q and is defined proximate to the first side 10C of the support 10. In the illustrated embodiment, the projection 10Q also defines a second slit 10R2 that extends through the projection 10Q and is defined proximate to the second side 10D of the support 10. Such use and purpose of the first slit 10R1 and the second slit 10R2 are described in more detail below.

Referring to FIG. 5, the support 10 also defines a base opening 10S in the base wall 10K. The base opening 10S defined in the base wall 10K is coaxial with passageway 10Q3 defined by the projection 10Q. As such, the passageway 10Q3 of the projection 10Q is in fluid communication with the exterior environment of the support 10 at the fourth end 10F via the base opening 10S. Such use and purpose of the base opening 10S is described in more detail below.

Referring to FIGS. 3 and 5-7, the support 10 defines a third set of openings 10T. As illustrated, each opening of the third set of openings 10T is defined along an outer perimeter of the support at the second end 10B, the first side 10C, and the second side 10D of the support 10. In the illustrated embodiment, the third set of openings 10T is separate and/or spaced apart from the cavity 101. Such use and purpose of the third set of openings 10T is described in more detail below.

Figure 6:
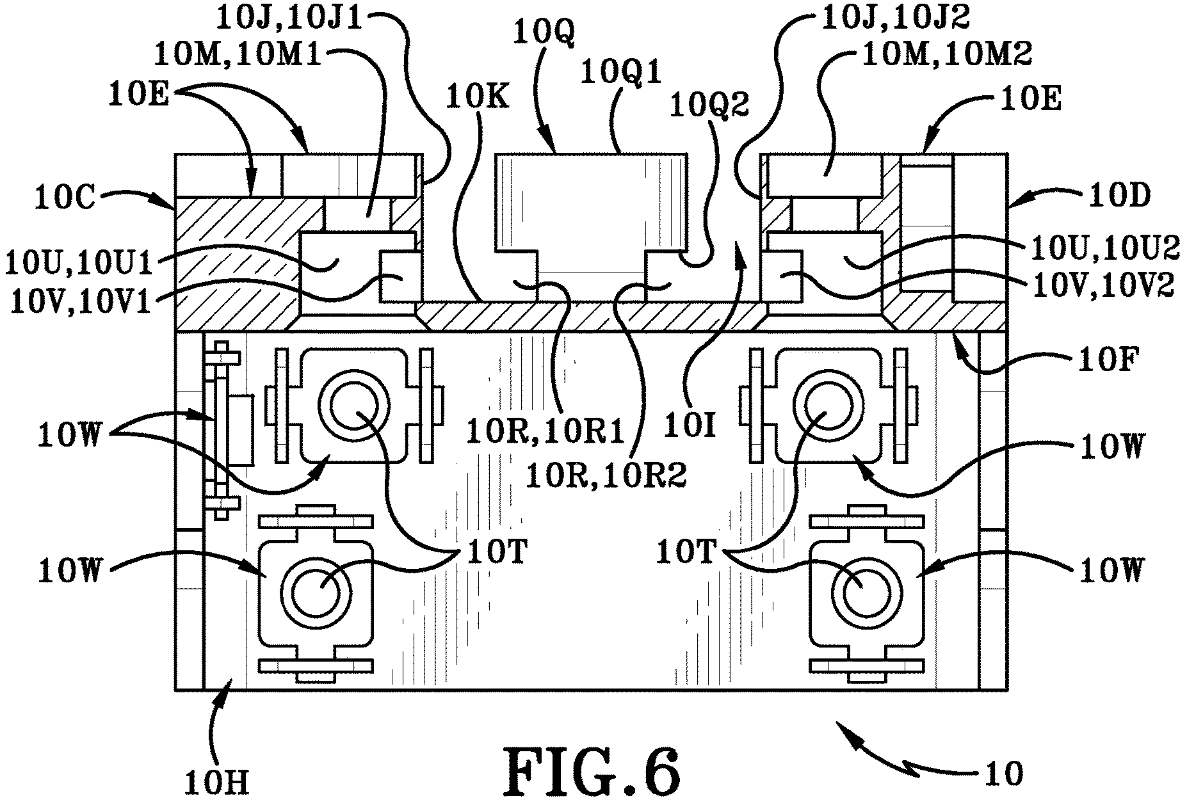
FIG. 6 (FIG. 6) is a transverse sectional view of the support taken in the direction of line 6-6 as shown in FIG. 4.

Referring to FIG. 6, the support 10 also defines at least one interior chamber 10U that is accessible via at least one channel 10V defined in the interior wall 10J. In the illustrated embodiment, the support 10 defines a first interior chamber 10U1 that is accessible via a first chamber 10V1 defined in the interior wall 10J proximate to the first side 10C. In the illustrated embodiment, the support 10 also defines a second interior chamber 10U2 that is accessible via a second chamber 10V2 defined in the interior wall 10J proximate to the second side 10D. Such use and purpose of the first interior chamber 10U1 and the second interior chamber 10U2 are described in more detail below.

Figure 7:
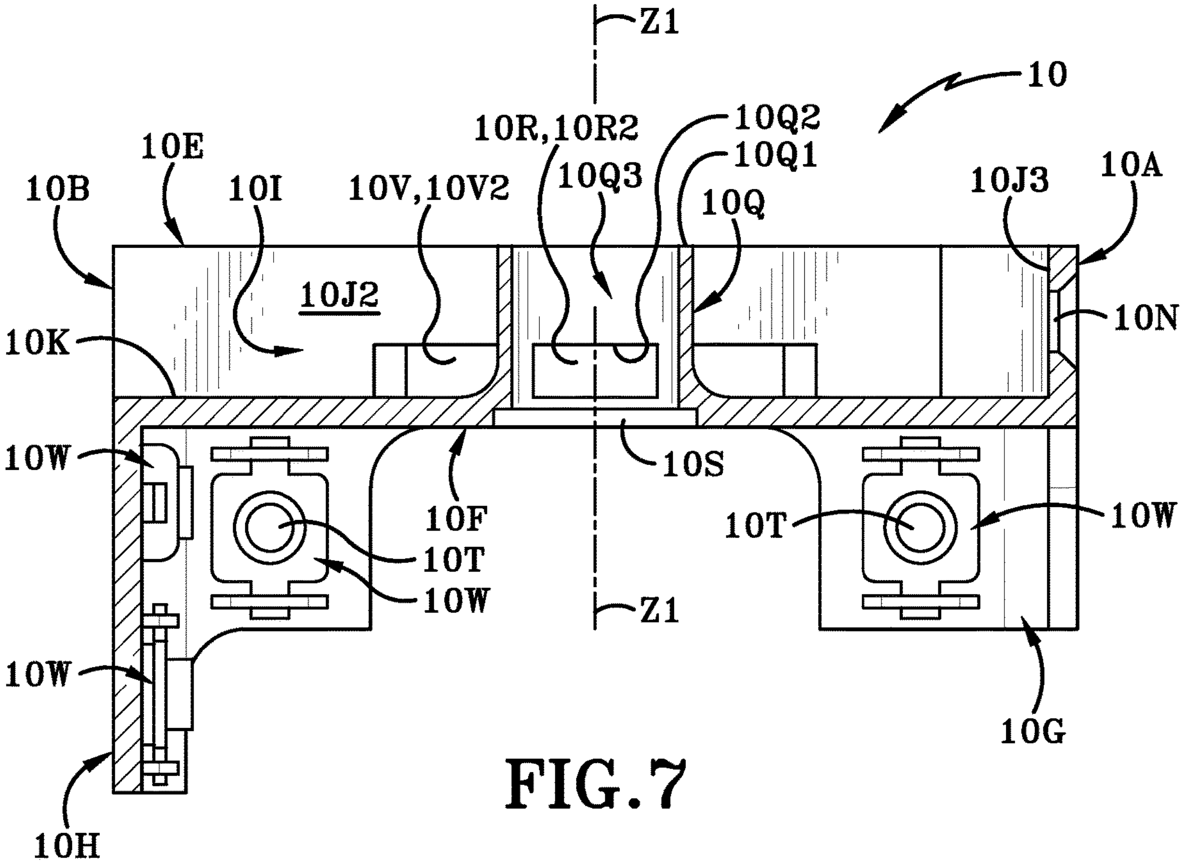
FIG. 7 (FIG. 7) is a longitudinal sectional view of the support taken in the direction of line 7-7 as shown in FIG. 4.

Referring to FIGS. 5-7, the support 10 may also include a set of attachment clips 10W operably engages with the first extension 10G and the second extension 10H. Each attachment clip of the set of attachment clips 10W aligns with a respective opening of the third set of openings 10T defined in the support 10. Such configuration between the third set of openings 10T and the set of attachment clips 10W enables an operator of the switch assembly 1 to operably engage separate components and/or devices with the switch assembly 1 interior to the first extension 10G and the second extension 10H (e.g., a thermal battery shown in FIGS. 19A-19C) and/or exterior to the first extension 10G and the second extension 10H.

Referring to FIGS. 3 and 9-15, the switch assembly 1 also includes a slide 20 that operably engages with the support 10. More particularly, the slide 20 operably engages with the support 10 inside of the cavity 101 defined in the support 10. Upon assembly, the slide 20 is slideably moveable inside of the support 10, via the cavity 101, along the longitudinal axis "X1" of the support 10 between a primed position (see FIGS. 16-17 and 19A-19B) and a released position (see FIG. 19C); such movement of the slide 20 inside of the support 10 is described in more detail below. As such, the following features of the slide 20 are described in greater detail below.

The slide 20 includes first end 20A, a second end 20B opposite to the first end 20A, and a longitudinal axis "X2" defined therebetween. The slide 20 also includes a first side 20C disposed between the first end 20A and the second end 20B, a second side 20D disposed between the first end 20A and the second end 20B and opposite to the first side 20C, and a transverse axis defined therebetween. The slide 20 also includes a top end 20E that is vertically above the first end 20A, the second end 20B, the first side 20C, and the second side 20D, a bottom end 20F that is vertically below the first end 20A, the second end 20B, the first side 20C, and the second side 20D and opposite to the top end 20E, and a vertical axis "Z2" defined therebetween.

Referring to FIG. 3, the slide 20 includes a main body 21 that has first end 21A, a second end 21B opposite to the first end 21A, and a longitudinal axis defined therebetween. The main body 21 also includes a first side 21C disposed between the first end 21A and the second end 21B, a second side 21D disposed between the first end 21A and the second end 21B and opposite to the first side 21C, and a transverse axis defined therebetween. The main body 21 also includes a first surface 21E that is vertically above the first end 21A, the second end 21B, the first side 21C, and the second side 21D, a second surface 21F that is vertically below the first end 21A, the second end 21B, the first side 21C, and the second side 21D and opposite to the first surface 21E, and a vertical axis defined therebetween. In the primed position (see FIGS. 16-17 and 19A-19B), the second end 21B is positioned inside of the cavity 101 of the support 10. In the released position (see FIG. 19C), the second end 21B is positioned outside of the cavity 101 of the support 10.

Referring to FIG. 10, the slide 20 also includes a tongue 22 that extends longitudinally from the second end 21B of the main body 21 in a direction rearward of the main body 21. More particularly, the tongue 22 includes a first end 22A that operably engages with the second end 21B of the main body 21 and a second end 22B opposite to the first end 22A and remote from the main body 21. The tongue 22 also includes a first side 22C disposed between the first end 22A and the second end 22B, and a second side 22D disposed between the first end 22A and the second end 22B and opposite to the first side 22C. The tongue 22 also includes a first surface 22E that is vertically above the first end 22A, the second end 22B, the first side 22C, and the second side 22D, and a second surface 22F that is vertically below the first end 22A, the second end 22B, the first side 22C, and the second side 22D and opposite to the first surface 22E. In the illustrated embodiment, the tongue 22 is integral and is a part of the main body 21 in that the tongue 22 is continuous with the main body 21. The tongue 22 is generally designed to operably engage with an interior surface of a vehicle to maintain the slide 20 at the primed position prior to ejection, which is described in greater detail below.

Figure 14:
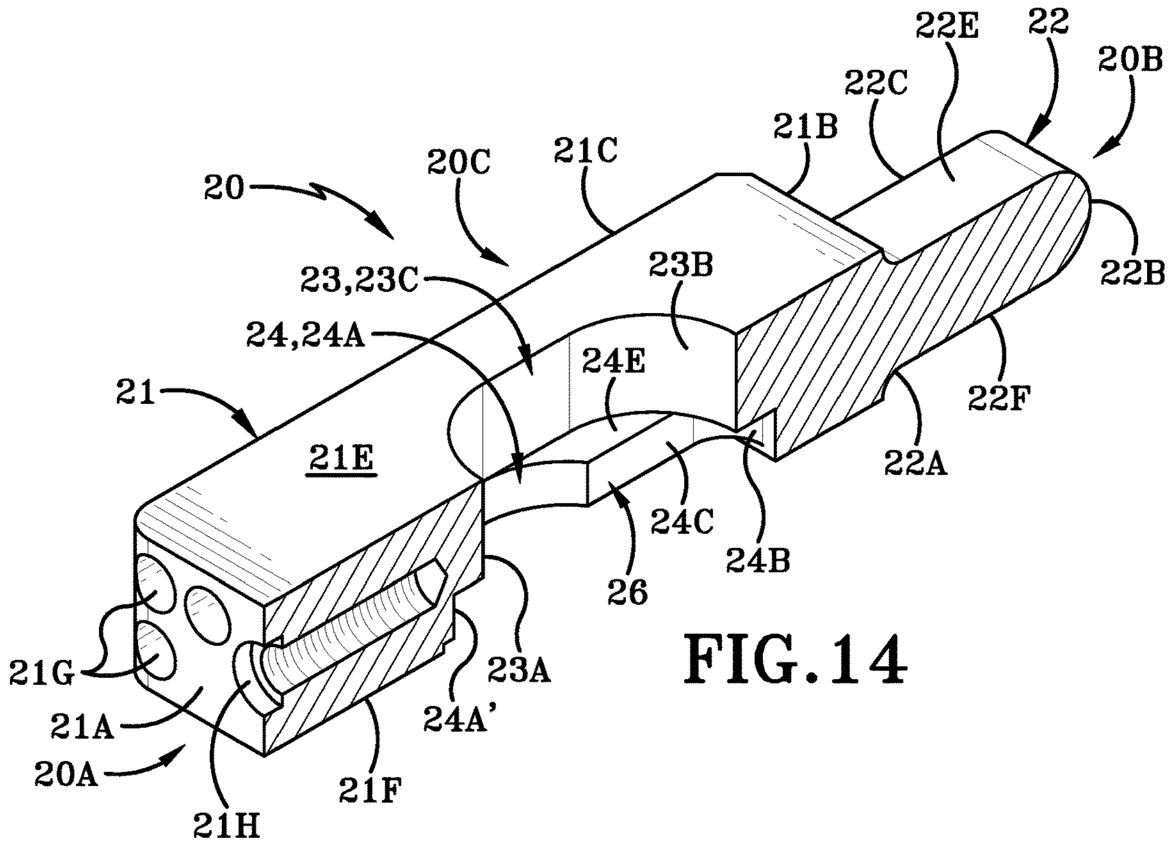
FIG. 14 (FIG. 14) is a longitudinal sectional view of the slide of the switch assembly.
Figure 15:
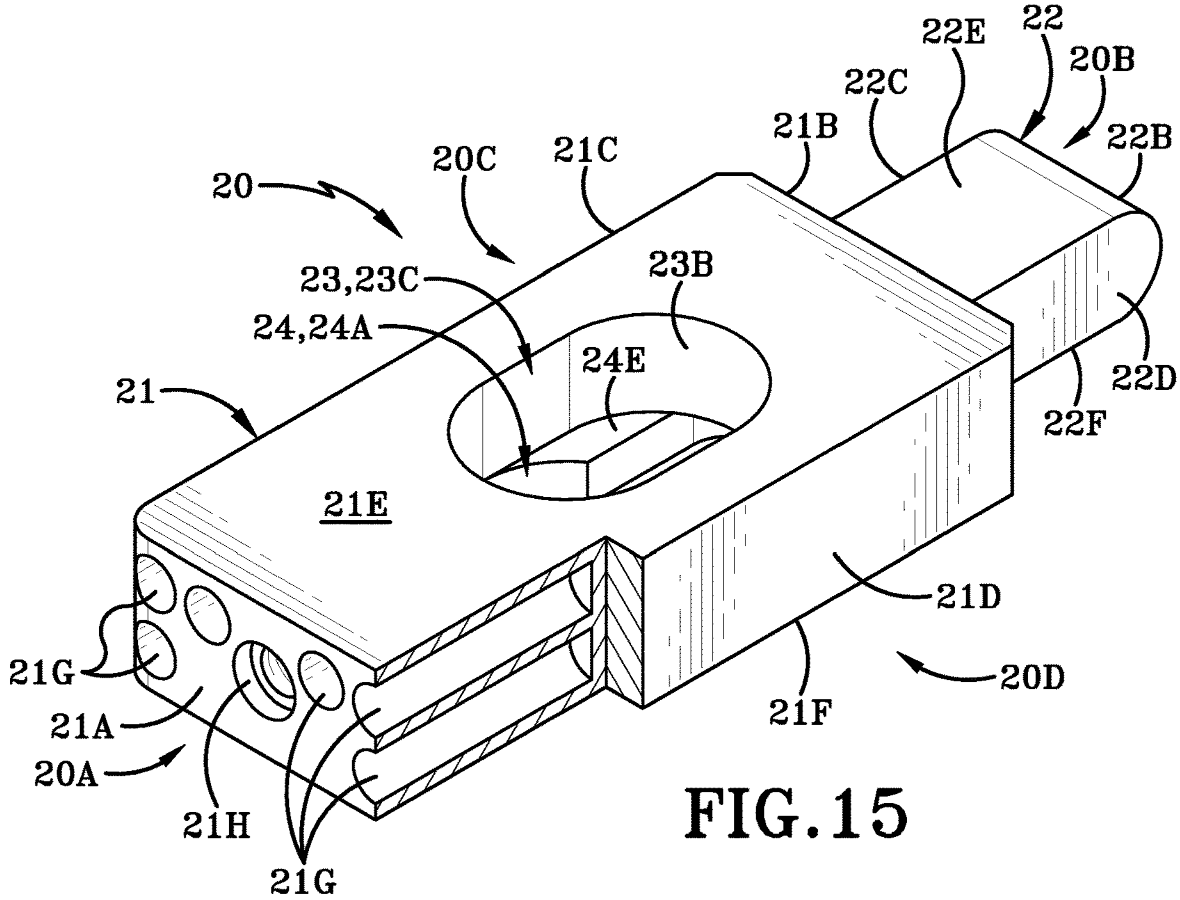
FIG. 15 (FIG. 15) is a longitudinal sectional view of the slide of the switch assembly.

Referring to FIGS. 10-14, the main body 21 defines at least one passage bound by at least one interior circumferential wall that extends through the main body 21 between the first surface 21E and the second surface 21F along an axis that is parallel with the vertical axis "Z2" of the slide 20. As illustrated in FIG. 14, the main body 21 defines a first passage 23 bound by a first interior circumferential wall of the main body 21 that extends downwardly into the main body 21 from the first surface 21E towards the second surface 21F along an axis that is parallel with the vertical axis "Z2" of the main body 21. More particularly, the first passage 23 is bound by a first interior wall 23A proximate to the first end 21A, a second interior wall 23B proximate to the second end 21B, a third interior wall 23C proximate to the first side 21C, and a fourth interior wall 23D proximate to the second side 21D. Each wall 23A, 23B, 23C, 23D collectively defines the first interior circumferential wall extends downwardly into the main body 21 from the first surface 21E towards the second surface 21F along an axis that is parallel with the vertical axis "Z2" of the main body 21.

Still referring to FIG. 14, the main body 21 also defines a second passage 24 bound by a second interior circumferential wall of the main body 21 that extends downwardly into the main body 21 from the first passage 23 towards the second surface 21F along an axis that is parallel with the vertical axis "Z2" of the main body 21. In the illustrated embodiment, the first passage 23 and the second passage 24 are coaxial with one another and allow fluid communication between the first surface 21E and the second surface 21F. In the illustrated embodiment, the second passage 24 is bound by a first interior wall 24A proximate to the first end 21A, a second interior wall 24B proximate to the second end 21B, a third interior wall 24C proximate to the first side 21C, and a fourth interior wall 24D proximate to the second side 21D, and a fifth interior wall 24A' longitudinally forward of the first interior wall 24A closer to the first end 21A. Each wall 24A, 24A', 24B, 24C, 24D collectively defines a shelf of the main body 21 that is positioned inside of the second passage 24, which is described in more detail below. Additionally, an engagement surface 24E is defined along an upper surface of each of the third interior wall 24C and the fourth interior wall 24D; such use and purpose of the engagement surface 24E is described in more detail below.

Figure 11:
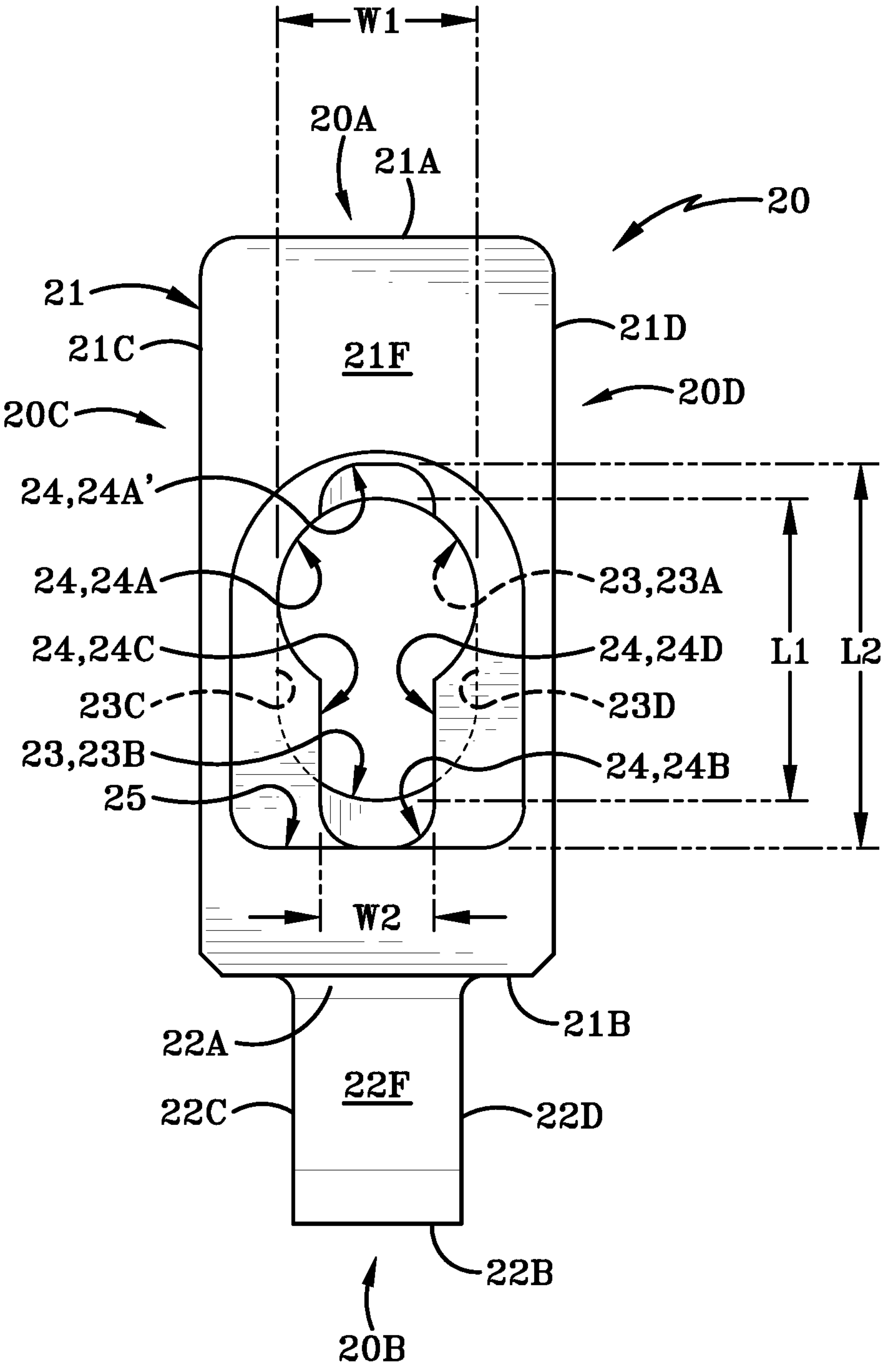
FIG. 11 (FIG. 11) is a bottom plan view of the slide of the switch assembly.

Referring to FIG. 11, the first passage 23 has a first length "L1" defined between the first interior wall 23A and the second interior wall 23B, and the second passage 24 defines a second length "L2" defined between the fifth interior wall 24A' and the second interior wall 24B. In the illustrated embodiment, the second length "L2" of the second passage 24 is greater than the first length "L1" of the first passage 23. Still referring to FIG. 11, the first interior wall 24A also defines a substantially circular opening having a first width "W1" that extends from the fifth interior wall 24A' to the third and fourth interior walls 24C, 24D. Similarly, the third interior wall 24C and the fourth interior wall 24D also collectively define an oblong opening between one another having a second width "W2" that extends between the first interior wall 24A and the second interior wall 24B. In the illustrated embodiment, the first width "W1" defined by the first interior wall 24A is greater than the second width "W2" defined collectively by the third interior wall 24C and the fourth interior wall 24D. In the illustrated embodiment, the first width "W1" is greater than an outside diameter of the projection 10Q, and the second width "W2" is less than the outside diameter of the projection 10Q.

Still referring to FIG. 14, the main body 21 also defines a third passage 25 bound by a third interior circumferential wall of the main body 21 that extends downwardly into the main body 21 from the second passage 24 to the second surface 21F along an axis that is parallel with the vertical axis "Z2" of the main body 21. The third passage 25 is vertically below both the first passage 23 and the second passage 24 and coaxial with the first passage 23 and the second passage 24.

Figure 12:
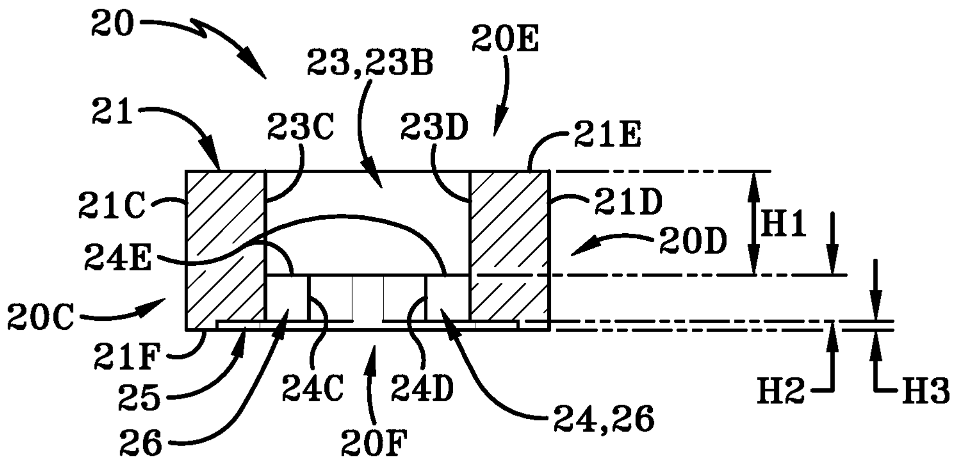
FIG. 12 (FIG. 12) is a transverse sectional view of the slide taken in the direction of line 12-12 as shown in FIG. 10.
Figure 13:
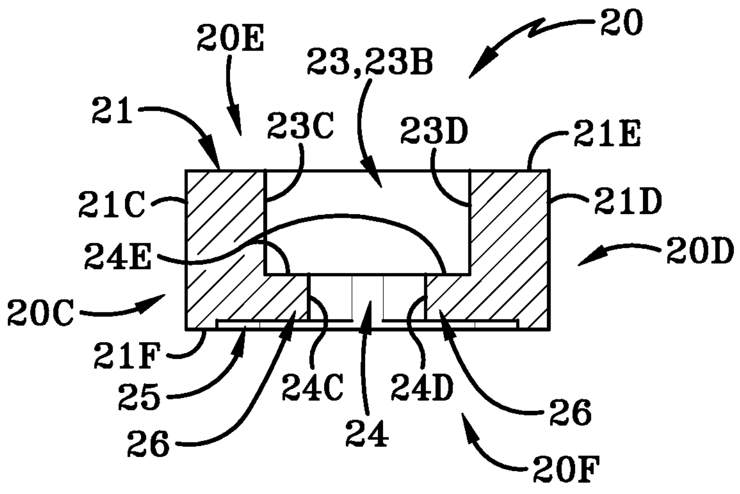
FIG. 13 (FIG. 13) is a transverse sectional view of the slide taken in the direction of line 13-13 as shown in FIG. 10.

Referring to FIG. 12, the main body 21 also defines various heights for the first passage 23, the second passage 24, and the third passage 25. In the illustrated embodiment, the first passage 23 includes a first height "H1" that is measured downwardly from the first surface 21E to the engagement surface 24E. The second passage 24 also includes a second height "H2" that is measured downwardly from the engagement surface 24E to an opposing surface on the shelf 26 facing away from the engagement surface 24E; stated differently, the second height "H2" is a thickness of the shelf 26. The third passage 25 also includes a third height "H3" that is measured downwardly from the shelf 26 to the second surface 21F of the main body 21. In the illustrated embodiment, the first height "H1" is greater than the second height "H2" and the third height "H3", and the second height "H2" is greater than the third height "H3".

Referring to FIGS. 10 and 11-14, the main body 21 also includes at least one shelf 26 that is positioned in the second passage 24. In the illustrated embodiment, the main body 21 includes a single shelf 26 that is one of position inside of the projection 10Q in the primed position and outside of the projection 10Q in the released position, which is described in more detail below. The shelf 26 is substantially planar relative to the longitudinal axis "X2" of the main body 21 (see FIGS. 10-11 and 14) and is positioned vertically below the first passage 23.

Referring to FIGS. 10-15, the shelf 26 is collectively defined by the first interior wall 24A, the second interior wall 24B, the third interior wall 24C, and the fourth interior wall 24D, and the fifth interior wall 24A' (as described above). During operation, the shelf 26 may include a first shelf region defined by the fifth interior wall 24A' that is configured to house and receive a portion of the projection 10Q when the slide 20 is provided in the released position. The shelf 26 may also include a second shelf region defined by the first interior wall 24A this is configured to house and receive the projection 10Q when the slide 20 is provided in the released position. The shelf 26 may also include a third shelf region defined by the third interior wall 24C and the fourth interior wall 24D and is configured to be received by the projection 10Q when the slide 20 is provided in the primed position. The shelf 26 may also include a fourth shelf region defined by the second interior wall 24B that is configured to house and receive a portion of the projection 10Q when the slide 20 is provided in the primed position.

Figure 16:
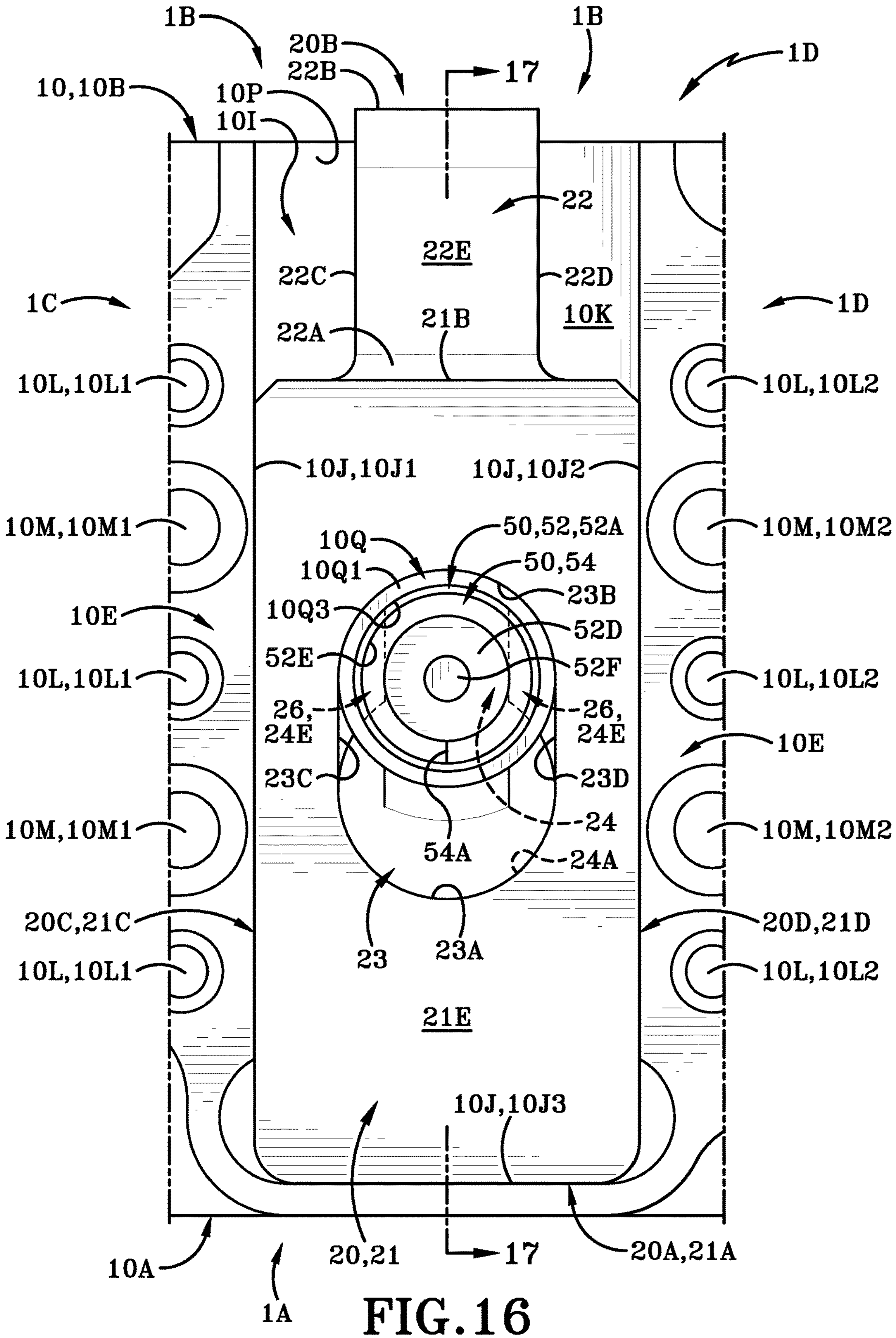
FIG. 16 (FIG. 16) is a partial top plan view of the switch assembly, wherein the cover is removed, and wherein the slide is provided in a primed position.
Figure 17:
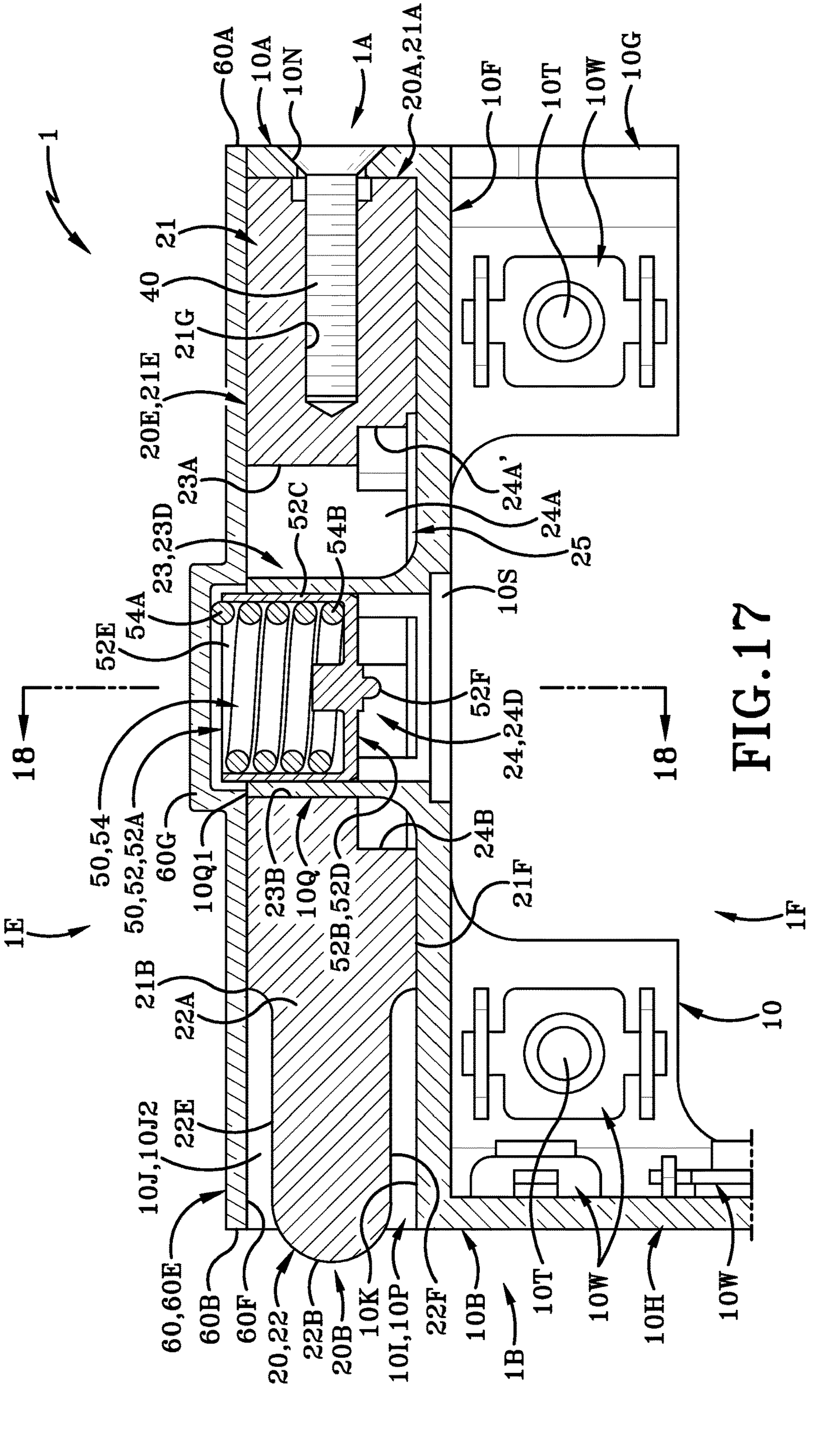
FIG. 17 (FIG. 17) is a longitudinal sectional view of the switch assembly taken in the direction of line 17-17 as shown in FIG. 16.

During operations, the third shelf region of the shelf 26 is positioned inside of the projection 10Q via the first slit 10R1 and the second slit 10R2 in the primed position (see FIG. 16). More particularly, the third interior wall 24C is positioned inside of the projection 10Q via the first slit 10R1, and the fourth interior wall 24D is positioned inside of the projection 10Q via the second slit 10R2. In the primed position, the outer surface of the projection 10Q directly interfaces with the second interior wall 23B of the first passage 23 proximate to the second end 21B of the main body 21. In the primed position, a portion of the projection 10Q positioned proximate to the base wall 10K is also housed inside of the second interior wall 24B (i.e., fourth shelf region of shelf 26). In the released position, the third shelf region 26C of the shelf is positioned outside of the projection 10Q. More particularly, the third interior wall 24C is positioned outside of the projection 10Q away from the first slit 10R1, and the fourth interior wall 24D is positioned outside of the projection 10Q away from the second slit 10R2. In the released position, the outer surface of the projection 10Q directly interfaces with the first interior wall 23A of the first passage 23 proximate to the first end 21A of the main body 21. In the released position, a portion of the projection 10Q positioned proximate to the base wall 10K is also housed inside of the fifth interior wall 24A' (i.e., the fifth shelf region of shelf 26).

Referring to FIGS. 9 and 10, the main body 21 also defines at least one chamber 21G. The at least one chamber 21G extends longitudinally into the main body 21 along an axis that is parallel with the longitudinal axis “X2” from the first end 21A towards the second end 21B terminating forwardly of the first passage 23 and the second passage 24. The at least one chamber 21G is also separate and/or spaced apart from the first passage 23 and the second passage 24. In the illustrated embodiment, the main body 21 defines six chambers 21G where each chamber 21G extends longitudinally into the main body 21 along an axis that is parallel with the longitudinal axis “X2” from the first end 21A towards the second end 21B terminating forwardly of the first passage 23 and the second passage 24. Such use and purpose of the at least one chamber 21G is described in more detail below.

Referring to FIGS. 9 and 10, the main body 21 also defines at least one threaded chamber 21H. The at least one threaded chamber 21H extends longitudinally into the main body 21 along an axis that is parallel with the longitudinal axis “X2” from the first end 21A towards the second end 21B terminating forwardly of the first passage 23 and the second passage 24. The at least one threaded chamber 21H is also separate and/or spaced apart from the first passage 23, the second passage 24, and the at least one chamber 21G. In the illustrated embodiment, the main body 21 defines a single threaded chamber 21H that extends longitudinally into the main body 21 along an axis that is parallel with the longitudinal axis “X2” from the first end 21A towards the second end 21B terminating forwardly of the first passage 23 and the second passage 24. Such use and purpose of the at least one threaded chamber 21H is described in more detail below.

Referring to FIG. 3, the switch assembly 1 also includes at least one biaser 30 that operably engages with the support 10 and the slide 20 upon assembly. As illustrated in FIG. 3, two biaser 30 are illustrated with the switch assembly 1. In other exemplary embodiment, any suitable number of biasers may be operably engaged with a support and a slide of a switch assembly based on various considerations, including the number of chamber defined in the slide of the switch assembly.

Still referring to FIG. 3, each biaser 30 includes a first end 30A that operably engages with the interior wall 10J of the support 10, and a second end 30B opposite to the first end 30A and that operably engages with the slide 20 inside a respective chamber 21G defined by the main body 21. During operation, each biaser 30 may define a first length (not illustrated) when the biaser 30 is compressed between the support 10 and the slide 20 when the slide 20 is provided in the primed position. Each biaser 30 may also define a second length (see FIG. 3) when the biaser 30 is expanded between the support 10 and the slide 20 when the slide 20 is provided in the released position. During operation, each biaser 30 of the switch assembly 1 provides an external force against the slide 20 to move the slide 20 from the cavity 101 of the support 10 during operation, which is described in more detail below.

In the illustrated embodiment, the biasers 30 described and illustrated are compression springs. In other exemplary embodiments, any suitable biaser and/or spring may be used for providing an external force against a slide 20 move the slide from a cavity of the support during operation.

Figure 2:
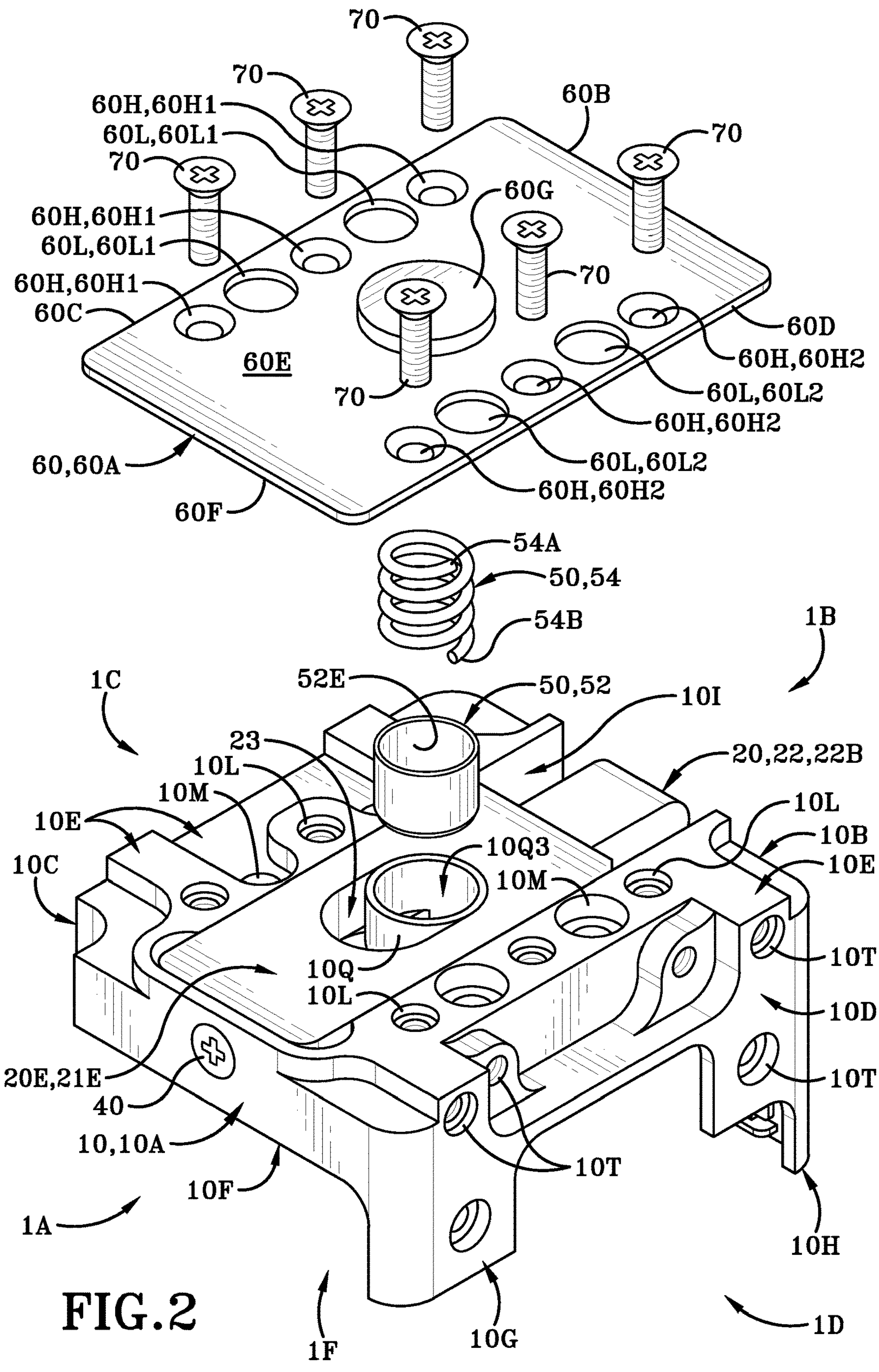
Figure 19A:
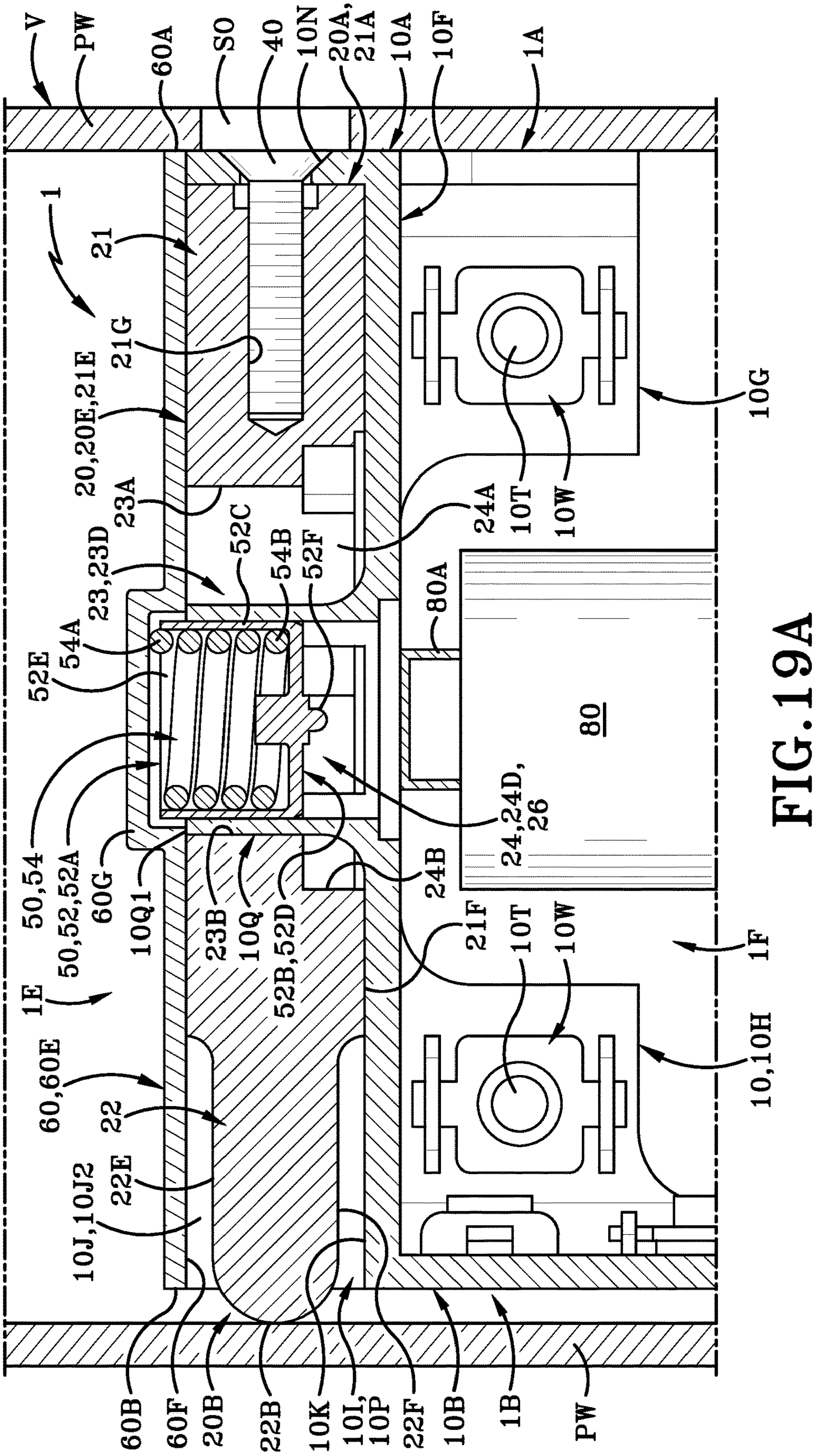
FIG. 19A (FIG. 19A) is an operational view of the switch assembly, wherein the switch assembly is loaded into a vehicle and the retaining member is operably engaged with slide and the support.
Figure 19B:
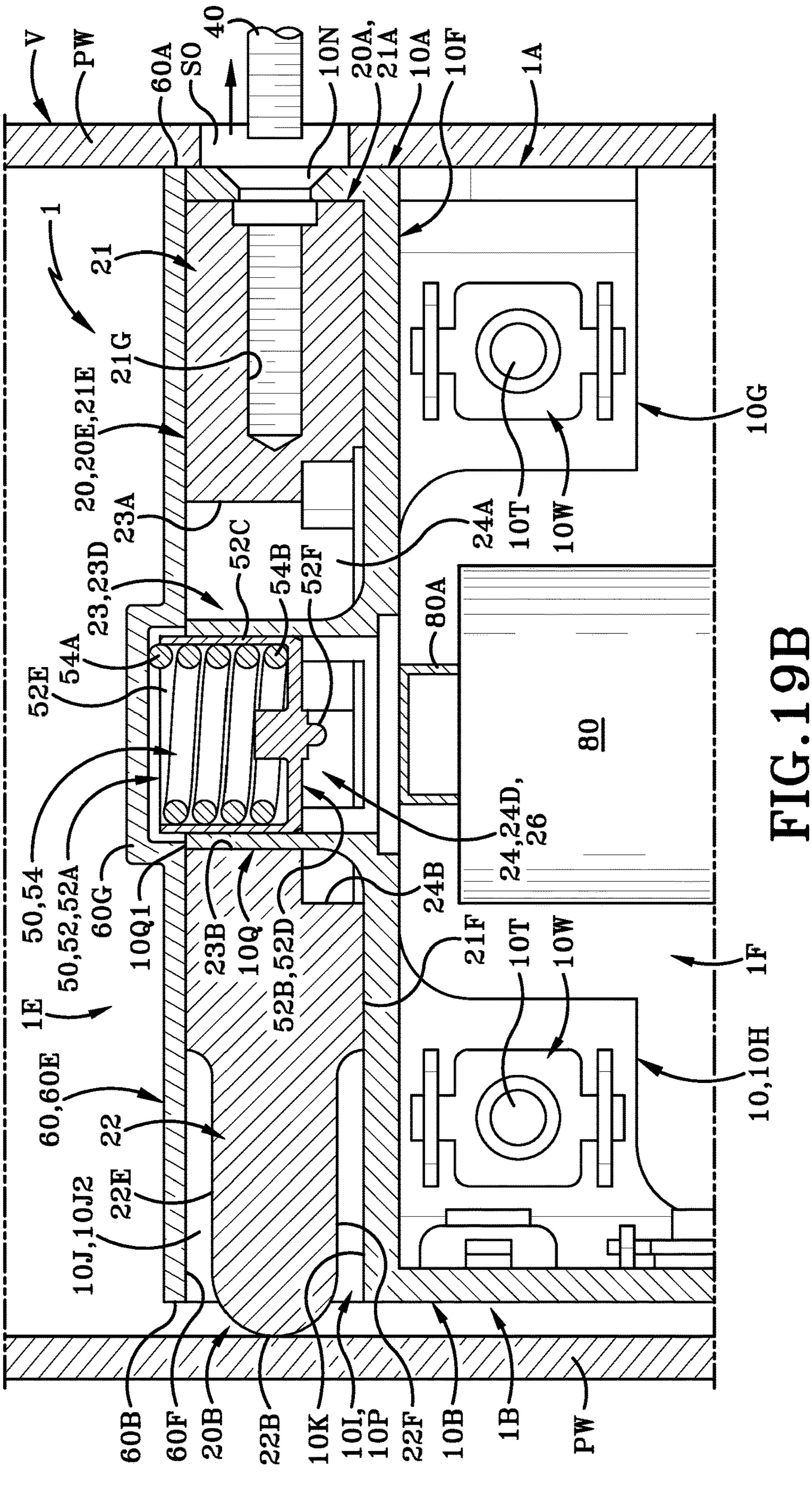
FIG. 19B (FIG. 19B) is another operational view similar to FIG. 19A, but the retaining member is disengaged from the slide and the support.

Referring to FIGS. 2-3 and 19B, the switch assembly 1 may include at least one set pin or retaining member 40 that operably engages with the support 10 and the slide 20. In the illustrated embodiment, a single retaining member 40 operably engages with the support 10 and the slide 20 to maintain the slide 20 at the primed position. In operation, the retaining member 40 passes through the through-hole 10N of the support 10 and threadably engages with the at least one threaded chamber 21H of the slide 20 to maintain the slide 20 at the primed position. In the illustrated embodiment, the retaining member 40 is a screw and/or fastener that is separable from the support 10 and the slide 20 (see FIG. 19B). In other exemplary embodiments, a retaining member of a switch assembly may be integral with one of the components or parts of the switch assembly for maintaining a slide of the switch assembly at a primed position.

Referring to FIG. 2, the switch assembly 1 may also include a firing pin mechanism 50 that operably engages with the support 10 and the slide 20. As described in more detail below, the firing pin mechanism 50 may also operably engage with other various components and parts of the switch assembly 1 once the switch assembly 1 is fully assembled for operation. During operation, the firing pin mechanism 50 is provided in a loaded position (see FIGS. 17-19B) when the slide 20 is provided in the primed position, and the firing pin mechanism 50 is provided in a firing position (see FIG. 19C) when the slide 20 is provided in the released position. The component and parts of the firing pin mechanism 50 are described in more detail below.

Figure 8:
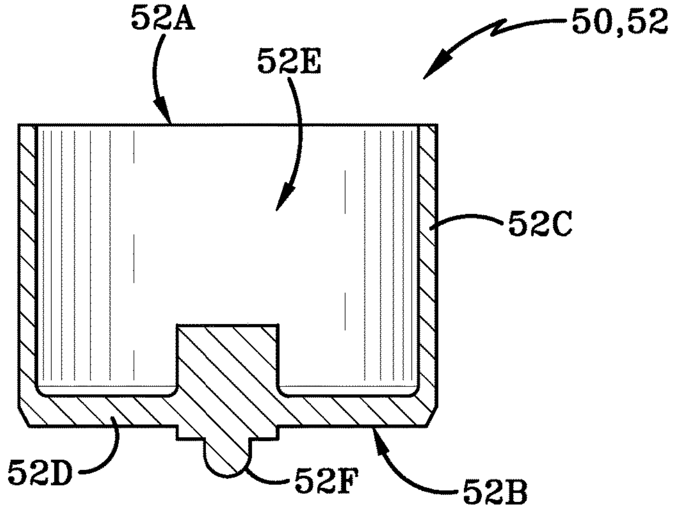
FIG. 8 (FIG. 8) is a sectional view of a plunger of the firing pin mechanism.

Referring to FIG. 8, the firing pin mechanism 50 includes a plunger 52 that operably engages with the support 10 and the slide 20 depending on the position of the slide 20 relative to the support 10 (i.e., the slide 20 being in the primed position or the released position relative to the support 10). In particular, the plunger 52 operably engages with the support 10 inside of the projection 10Q and operably engages with the shelf 26 and when the slide 20 is provided in the primed position.

Referring to FIG. 8, the plunger 52 includes a first or top end 52A, a second or bottom end 52B vertically opposite to the top end 52A, and a vertical axis defined therebetween. The plunger 52 also includes a vertical peripheral wall 52C that extends between the top end 52A and the bottom end 52B of the plunger 52. The plunger 52 also includes a base wall 52D that operably engages with the vertical peripheral wall 52C and is positioned at the bottom end 52B of the plunger 52. As illustrated in FIGS. 17-19B, the vertical peripheral wall 52C and the base wall 52D that form the plunger 52 are sized and configured to be received inside of the projection 10Q and to be received inside of the first passage 23 and the second passage 24 of the slide 20. The plunger 52 also defines a chamber 52E that extends vertically downward from the top end 52A towards the bottom end 52B along the vertical axis of the plunger 52. More particular, the chamber 52E is collectively defined by the vertical peripheral wall 52C and the base wall 52D where the chamber 52E is accessible at the open top end 50A of the plunger 52.

Still referring to FIG. 8, the plunger 52 also includes a firing pin 52F. The firing pin 52F operably engages with the base wall 52D in which a first portion of the firing pin 52F is positioned inside of the chamber 52E and a second portion of the firing pin 52F is positioned exterior to the chamber 52E. The second portion of the firing pin 52F is configured to engage and initiate operation of thermal battery that is operably engaged with the switch assembly 1, which is described in more detail below. As such, the firing pin 52F may have any suitable shape, size, or configuration that is complementary with and/or matches with a thermal battery to initiate operation of said thermal battery. In the illustrated embodiment, the firing pin 52F is integral with the base wall 52D and forms the plunger 52. In other exemplary embodiments, a firing pin of a plunger may be separate from a base wall of the plunger.

Referring to FIGS. 2 and 17-19C, the firing pin mechanism 50 may also include a biaser 54 that operably engages with the plunger 52 and a cover of the switch assembly 1, which is described in more detail below. The biaser 54 includes a first end 54A that operably engages with a cover of the switch assembly 1, which is described in more detail below, and a second end 54B opposite to the first end 54A that operably engages with the base wall 52D of the plunger 52. As illustrated, the biaser 54 is a compression-type spring to bias the plunger 52 from the loaded position (FIGS. 17-19B) to the fired position (FIG. 19C) when the slide 20 is provided in the released position; such biasing actions provided by the biaser 54 is described in more detail below. In other exemplary embodiments, any suitable biaser and/or spring may be used to bias a plunger from a loaded position to a fired position when a slide is provided in a released position.

Referring to FIG. 2, the switch assembly 1 may also include a cover 60 that operably engages with the support 10 and the firing pin mechanism 50. As illustrated in FIGS. 17-19C, the cover 60 operably engages with the support 10 while encasing a portion of the slide 20 and the firing pin mechanism 50 inside of the support 10. In the illustrated embodiment, the cover 60 is removable from the support 10 in order to allow an operator of the switch assembly 1 to remove and/or replace specific components and parts, including the slide 20, the at least one biaser 30, and the components of the firing pin mechanism 50. The features and characteristics of the cover 60 are described in more detail below.

Referring to FIG. 2, the cover 60 includes a first end 60A, a second end 60B longitudinally opposite to the first end 60A, and a longitudinal axis defined therebetween. The cover 60 also includes a first side 60C that is positioned between the first end 60A and the second end 60B, a second side 60D transversely opposite to the first side 60C and positioned between the first end 60A and the second end 60B, and a transverse axis defined therebetween. The cover 60 also includes a first surface 60E defined vertically above the first end 60A, the second end 60B, the first side 60C, and the second side 60D, a second surface 60F defined vertically below the first end 60A, the second end 60B, the first side 60C, and the second side 60D and vertically opposite to the first surface 60E, and a vertical axis defined therebetween.

Still referring to FIG. 2, the cover 60 also includes a hollow protrusion or cap 60G that extends vertically upward from the first surface 60E away from the cover 60. Upon assembly, the cap 60G of the cover 60 is coaxial with the projection 10Q of the support 10 when the support 10 and the cover 60 operably engage with one another (see FIGS. 17-19C). Additionally, the cap 60G operably engages with the first end 54A of the biaser 54 of the firing pin mechanism 50 upon assembly of the switch assembly 1 (see FIGS. 17-19C). The cap 60G is also configured to receive and house a portion of the plunger 52 in which the top end 52A of the plunger 52 is positioned inside of the cap 60G when the firing pin mechanism 50 is provided in the loaded position (see FIGS. 17-19B). In the illustrated embodiment, the cap 60G is integral with the cover 60 in that the cap 60G is formed into the cover 60. In other exemplary embodiments, a cap of a cover may be a separate component that operably engages with the cover upon assembly.

Still referring to FIG. 2, the cover 60 defines at least one set of apertures that extends entirely through the cover 60 along axes that are parallel with the vertical axis of the cover 60. In the illustrated embodiment, the cover 60 may include a first set of apertures 60H that extends entirely through the cover 60 where each aperture extends along an axis that is parallel with the vertical axis of the cover 60. A first group of apertures 60H1 of the first set of apertures 60H is defined proximate to the first side 60C of the cover, and a second group of apertures 60H2 first set of apertures 60H is defined proximate to the second side 60D of the cover 60 opposite to the first group of apertures 60H1. The first set of apertures 60H is also recessed and/or countersunk when connectors are operably engaged with the cover 60, which are described in more detail below. Upon assembly of the switch assembly 1, the first set of apertures 60H of the cover 60 and the first set of openings 10L of the support 10 are coaxial with one another.

Still referring to FIG. 2, the cover 60 may include a second set of apertures 60L that extends entirely through the cover 60 where each aperture extends along an axis that is parallel with the vertical axis of the cover 60. A first group of apertures 60L1 of the second set of apertures 60L is defined proximate to the first side 60C of the cover, and a second group of apertures 60L2 of the second set of apertures 60L is defined proximate to the second side 60D of the cover 60 opposite to the first group of apertures 60L1. The second set of apertures 60H is also recessed and/or countersunk when connectors are operably engaged with the cover 60, which are described in more detail below. Upon assembly of the switch assembly 1, the second set of apertures 60L of the cover 60 and the second set of openings 10M of the support 10 are coaxial with one another.

Figure 18:
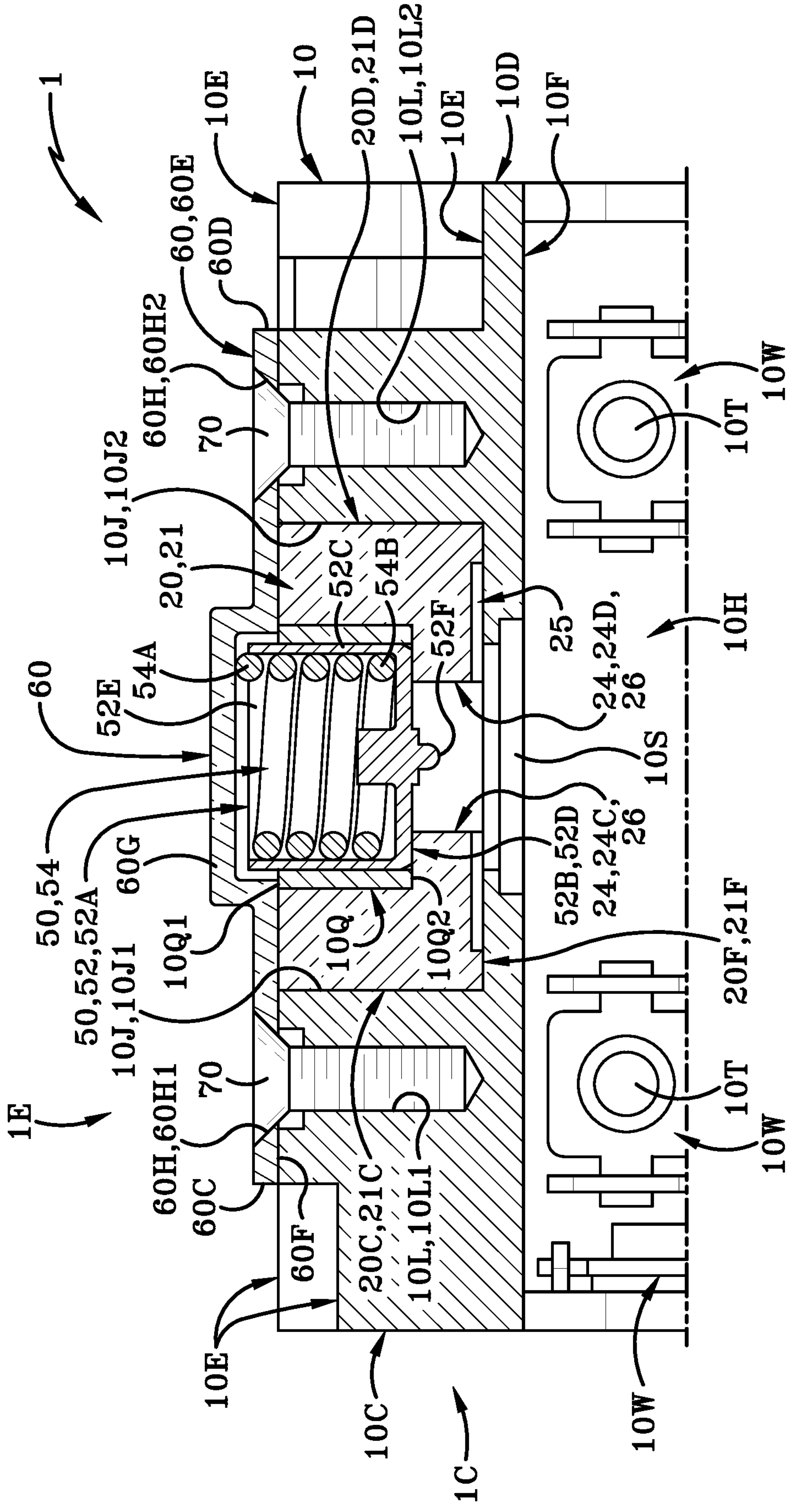
FIG. 18 (FIG. 18) is a vertical sectional view of the switch assembly taken in the direction of line 18-18 as shown in FIG. 17.

Referring to FIGS. 2 and 18, the switch assembly 1 also includes connectors 70 that operably engage the support 10 and the cover 60 with one another. Upon assembly, each connector 70 is passed through one of the apertures of the set of apertures 60H defined in the cover 60 and threadably engages with the support 10 via one of the openings of the first set of openings 10L. In the illustrated embodiment, the switch assembly 1 includes six connectors 70 that operably engage the support 10 and cover 60 with one another via six openings 10L defined in the support 10 and six apertures 60H defined in the cover 60. In other exemplary embodiments, any suitable number of connector may be used to operably engage a support and a cover with one another. In other exemplary embodiments, any suitable component and/or parts may be used to operably engage a support and a cover with one another.

While not illustrated herein, connectors may also be used to operably engage the switch assembly 1 with a thermal battery or other separate components and devices. Specifically, connectors may be passed through the second set of openings 10M and the second set of apertures 60L and threadably engage with a thermal battery to operably engage the switch assembly 1 with the thermal battery.

Having now described the components and parts of the switch assembly 1, a method of using the switch assembly 1 to initiate a thermal battery is described in more detail below.

Prior to a mission or operational use, an operator must configure the switch assembly 1. As such, an operator may begin with operably engaging the slide 20 with the support 10. Here, the biasers 30 may be operably engaged with the slide 20 via the chambers 21G defined in the slide 20. Once engaged, the slide 20 and the biaser 30 may be collectively introduced to the support 10. At this point, the slide 20 is then inserted into the cavity 101 of the support 10 and introduced to the projection 10Q of the support 10. The projection 10Q is first inserted into the second passage 24, past the first interior wall 24A, and then housed inside of the first passage 23. The biasers 30 also operably engage with the interior wall 10J of the support 10 inside of the cavity 101 once the slide 20 is introduced and engage with the support 10.

The operator may then operably engage the retaining member 40 with the support 10 and slide 20 to maintain the slide 20 at the primed position (see FIG. 16). Such retaining of the slide 20 at the primed position enables the operator to introduce and engage the firing pin mechanism 50 with the support 10 and the slide 20. At this point, the operator may slideably move the slide 20 towards the first end 10A of the support 10. Once in the primed position, a portion of the shelf 26 is positioned inside of the projection 10Q via the first slit 10R1 and the second slit 10R2. More particularly, the third interior wall 24C is positioned inside of the projection 10Q via the first slit 10R1, and the fourth interior wall 24D is positioned inside of the projection 10Q via the second slit 10R2. Once the third interior wall 24C and the fourth interior wall 24D are housed inside of the projection 10Q, the plunger 52 may then be inserted into the projection 10Q until the base wall 52D rests on the engagement surface 24E defined along the third interior wall 24C and the fourth interior wall 24D. Such housing of the third interior wall 24C and the fourth interior wall 24D of the shelf 26 inside of the projection 10Q is considered advantageous because the third interior wall 24C and the fourth interior wall 24D maintains the plunger 52 of the firing pin mechanism 50 at the loaded position, via the engagement surface 24E, until the slide 20 transitions from the primed position to the released position during operation. Once the plunger 52 rests on the shelf 26, the biaser 54 is then inserted into the plunger 52 where the second end 54B operably engages with the plunger 52.

The operator may then introduce the cover 60 to the third end 10E of the support 10 to encase and retain the slide 20, the biasers 30, and the firing pin mechanism 50 between the support 10 and the cover 60. Once the cover 60 is resting on the support 10, the operator may then insert the connectors 70 into the cover 60 and threadably engage said connectors 70 with the support 10. Once the connectors 70 operably engage the support 10 and the cover 60 with one another, the first end 54A of the biaser 54 operably engages with the cover 60 inside of the cap 60G. The firing pin mechanism 50 is now held at a loaded position when the biaser 54 is compressed between the cover 60 and the base wall 52D of the plunger 52 and the plunger 52 directly abuts the shelf 26 of the slide 20.

Once the switch assembly 1 is fully assembly, the switch assembly 1 may be operably engaged with a thermal battery 90 inside or outside of a vehicle “V” for a specific operation. In the operational views, the switch assembly 1 and thermal battery 90 are positioned inside of the vehicle “V” (see FIG. 19A). Once inside the vehicle “V”, the tongue 22 of the slide 20 operably engages with a peripheral wall “PW” of the vehicle “V” inside of the vehicle “V” to maintain the slide 20 in the primed position. More particularly, as shown in FIG. 19A, the second end 22B of the tongue 22 directly abuts the peripheral wall “PW” of the vehicle “V” the peripheral wall “PW” of the vehicle “V” to maintain the slide 20 in the primed position in combination with the retaining member 40. It should be noted that the retaining member 40 is configured to maintain the slide 20 at the primed position when the switch assembly 1 is positioned outside of a vehicle “V” prior to loading operations.

Once the switch assembly 1 is positioned at a desired position inside of the vehicle “V” as shown in FIG. 19A, the operator may then remove the retaining member 40 from the support 10 and the slide 20. As illustrated in FIG. 19B, the operator may disengage the retaining member 40 from the support 10 and the slide 20 by passing the retaining member 40 through a side opening “SO” defined in the peripheral wall “PW” of the vehicle “V”. While not illustrated herein, the retaining member 40 may also be disengaged from the support 10 and the slide 20 when the tongue 22 operably engages with the peripheral wall “PW” of the vehicle “V” and a portion of the switch assembly 1 is positioned outside of the vehicle “V” so that the retaining member 40 may be disengaged. Once the retaining member 40 is disengaged, the slide 20 is only retained at the primed position due to the interaction between the tongue 22 of the slide 20 and the peripheral wall “PW” of the vehicle “V”.

At a predetermined time, the switch assembly 1 and the thermal battery 80 (along with other components inside of the vehicle “V”) may then be launched or ejected from the vehicle “V” for a specific operation. The ejection of the switch assembly 1 and the thermal battery 80 from the vehicle “V” is denoted by an arrow labeled “A” in FIG. 19C. Once the switch assembly 1 exits the vehicle “V”, the slide 20 may then transition from the primed position to the released position when the tongue 22 is free from engaging the peripheral wall "PW" of the vehicle "V". Once the tongue 22 is free from engaging the vehicle "V", the biasers 30 transition the slide 20 from the primed position to the released position by exerting force against the slide 20 in a direction towards the second end 1B of the switch assembly 1 (see FIG. 19C). The force exerted against the slide 20 by the biasers 30 is denoted by arrows labeled "B" in FIG. 19C. In the illustrated embodiment, the slide 20 moves in a first direction (as denoted by arrows labeled "B") relative to the support 10 along an axis that is parallel with the longitudinal axis "X1" of the support 10.

Figure 19C:
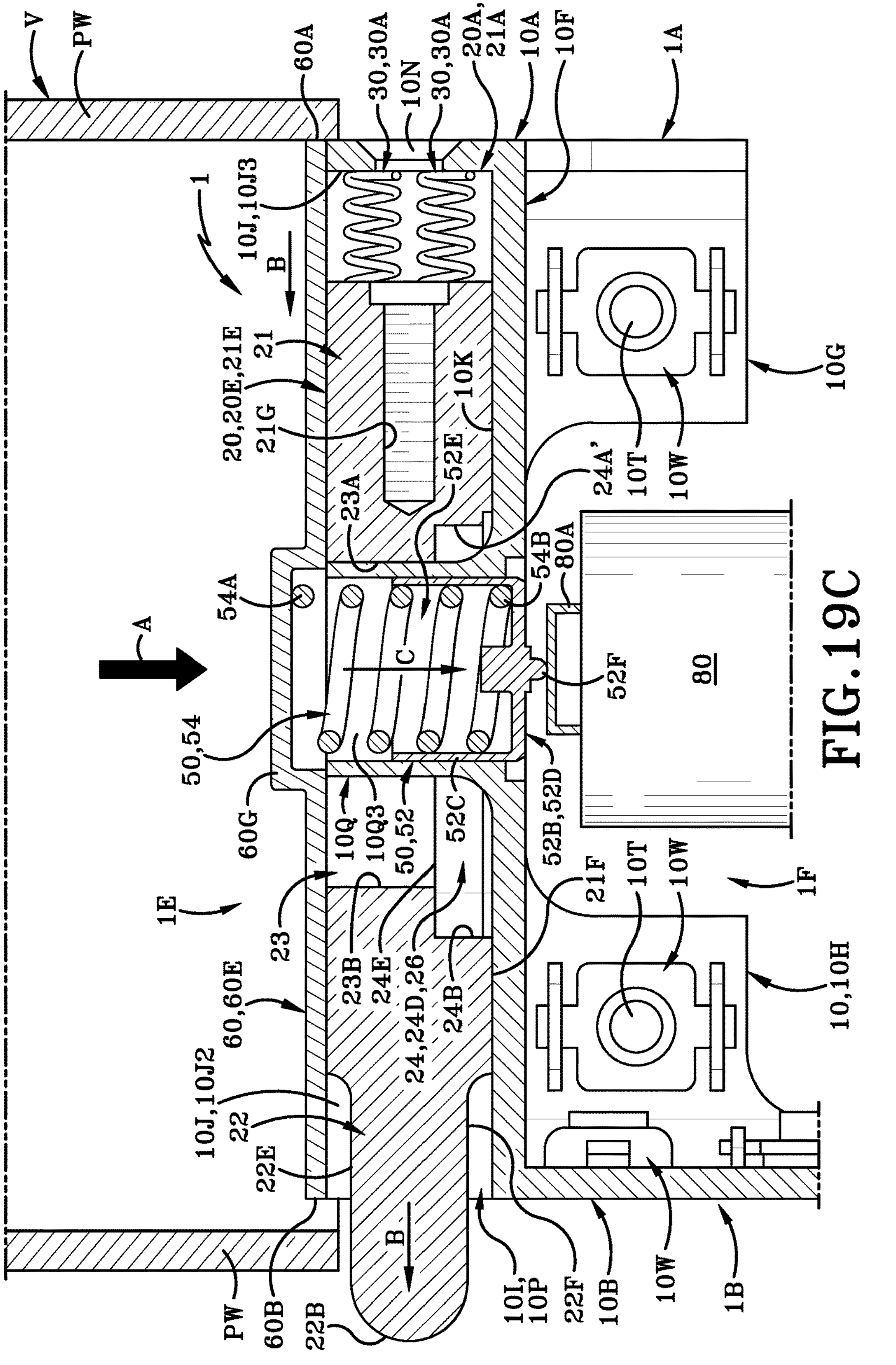
FIG. 19C (FIG. 19C) is another operational view similar to FIG. 19C, but the switch assembly is ejected from the vehicle causing the switch assembly to activate a thermal battery operably engaged with the switch assembly.

As the slide 20 transitions from the primed position to the released position, the firing pin mechanism 50 also transitions from the loaded position to the fired position. As illustrated in FIG. 19C, the third interior wall 24C and the fourth interior wall 24D move away and from the projection 10Q as the slide 20 transitions towards the released position. As the third interior wall 24C and the fourth interior wall 24D move away, the base wall 52D of the plunger 52 is free from resting on and/or engaging with the engagement surface 24E defined on the third interior wall 24C and the fourth interior wall 24D. At this point, the plunger 52 then transitions downwardly away from the slide 20 and support 10 via the biaser 54. As described above, the plunger 52 is freely moveable through the shelf 26 since the outer diameter of the plunger 52 is less than the first width "W1" defined by the first interior wall 24A. Stated differently, the structural configuration of first interior wall 24A is designed to enable the plunger 52 to move downwardly without any impedance from the shelf 26 to initiate operation of the thermal battery 80 once the switch assembly 1 is positioned outside of the vehicle "V". Once the plunger 52 is exerted downwardly through the slide 20 and the support 10, the firing pin 52F then engages an ignitor or percussion cap 80A of the thermal battery 80 to initiate operation of the thermal battery 80 for the specific operation. Such downward movement of the plunger 52 via the biaser 54 is denoted by an arrow labeled "C" in FIG. 19C. In the illustrated embodiment, the plunger 52 moves in a second direction (as denoted by arrows labeled "C") relative to the support 10 along an axis that is parallel with the vertical axis "Z1" of the support 10. During operation, the second directional movement of the plunger 52 is perpendicular to the first directional movement of the slide 20.

The switch assembly 1 described and illustrated herein may be repeatedly used with the thermal battery 80 described and illustrated herein or other thermal batteries of the like for various operations. As such, the switch assembly 1 may be reconfigured and/or reassembled such that the slide 20 is provided in the primed position and the firing pin mechanism 50 is provided in the loaded position for initiating operation of another thermal battery for another operation. Moreover, the switch assembly 1 described and illustrated herein operates by mechanical operations only without further electrical, pneumatic, or hydraulic assistance for initiating operation of a thermal battery.

Figure 20:
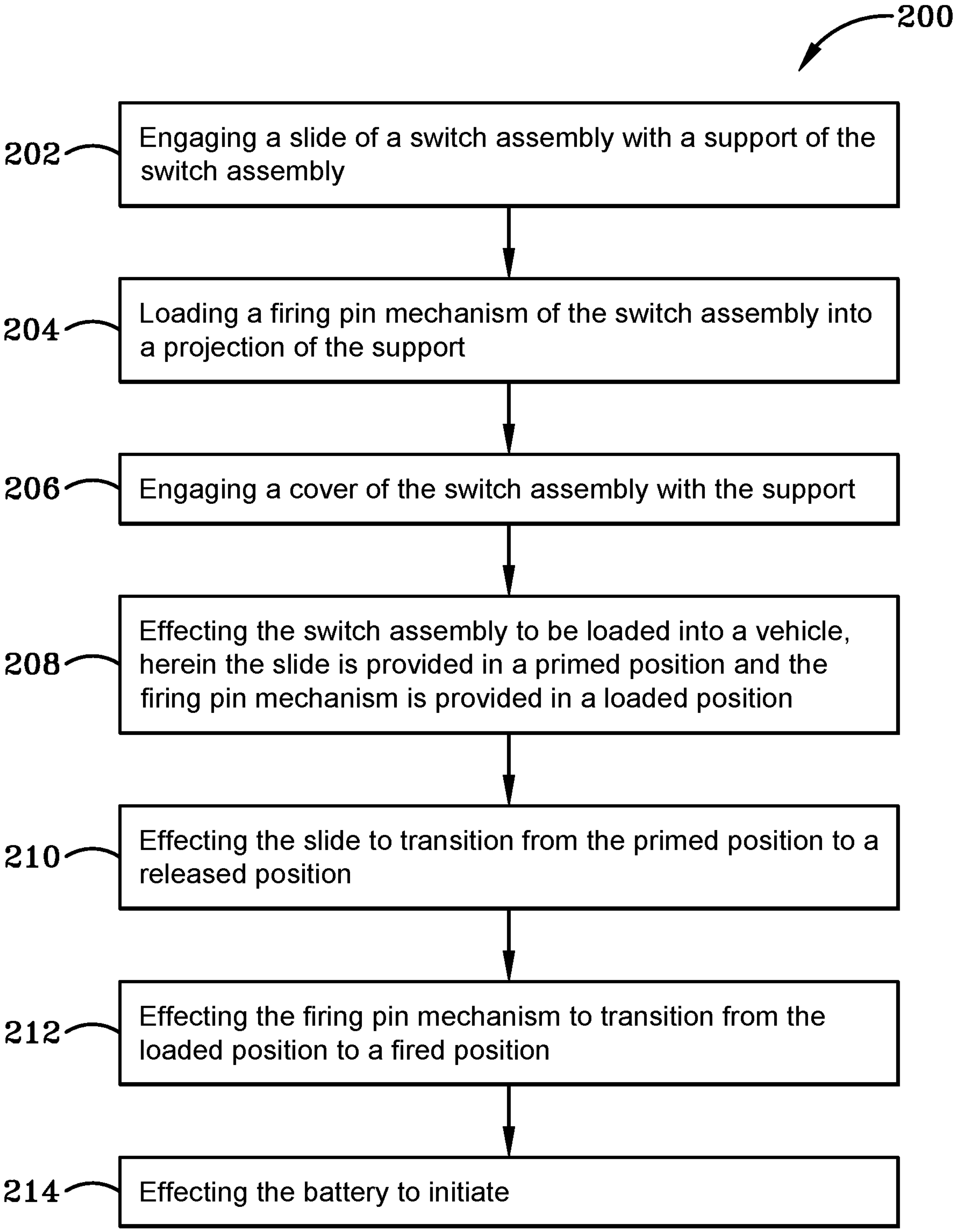
FIG. 20 (FIG. 20) is an exemplary method flowchart of effecting a thermal battery to initiate.

FIG. 20 illustrates a method 200 of effecting a battery to initiate. An initial step 202 of method 200 comprises engaging a slide of a switch assembly with a support of the switch assembly. Another step 204 of method 200 comprises loading firing pin mechanism of the switch assembly into a projection of the support. Another step 206 of method 200 comprises engaging a cover of the switch assembly with support. Another step 208 of method 200 comprises effecting the switch assembly to be loaded into a launcher housing, wherein the slide is provided in a primed position and the firing pin mechanism is provided in a loaded position. Another step 210 of method 200 comprises effecting the slide to transition from the primed position to a released position. Another step 212 of method 200 comprises effecting the firing pin mechanism to transition from the loaded position to a fired position. Another step 214 of method 200 comprises effecting the battery to initiate.

The method 200 described herein may include optional steps for other exemplary and/or additional embodiments. Optional steps may further include positioning at least one shelf of the slide inside at least one slit defined by a projection of the support; and engaging a plunger of the firing pin mechanism with the at least one shelf to maintain the firing pin mechanism at the loaded position. An optional step may further include engaging a biaser of the firing pin mechanism with the plunger and the cover. An optional step may further include effecting a retaining member of the switch assembly to engage the slide and the support with one another prior to the switch assembly being loaded into a vehicle. An optional step may further include effecting a retaining member of the switch assembly to disengage the slide and the support from one another subsequent to the switch assembly being loaded into the vehicle. Optional steps may further include moving the slide away from the support, via at least one biaser of the switch assembly, from the primed position to the released position; removing the at least one shelf of the slide from the at least one slit of the projection; disengaging the plunger from the at least one shelf; and moving the plunger away from the slide and the support, via the biaser of the firing pin mechanism, from the loaded position to the fired position. Optional steps may further include effecting a first set of connectors to operably engage the cover and the support with one another via a first set of apertures defined in the cover and a first set of openings defined in the support; and effecting a second set of connectors to operably engage the cover and the support with the battery via a second set of apertures defined in the cover and a second set of openings defined in the support.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal”, “lateral”, “transverse”, “longitudinal”, and the like are used herein for the purpose of explanation only unless specifically indicated otherwise.

Although the terms “first” and “second” may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to “an embodiment,” “one embodiment,” “some embodiments,” “one particular embodiment,” “an exemplary embodiment,” or “other embodiments,” or the like, means that a particular feature, structure, or characteristic described in connection with the embodiments is included in at least some embodiments, but not necessarily all embodiments, of the invention. The various appearances “an embodiment,” “one embodiment,” “some embodiments,” “one particular embodiment,” “an exemplary embodiment,” or “other embodiments,” or the like, are not necessarily all referring to the same embodiments.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element, that does not preclude there being more than one of the additional element.

As used herein in the specification and claims, including as used in the examples and unless otherwise expressly specified, all numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A switch assembly, comprising:
- a support adapted to operably engage with a battery, wherein the support comprises:
  - a first surface;
  - a second surface opposite to the first surface;
  - a cavity defined in the support extending downwardly from the first surface towards the second surface to a base wall; and
  - a projection extending upwardly inside of the cavity from the base wall towards the first surface;
- a slide operably engaged with the support and moveable in a first direction relative to the support between a primed position and a released position;
- a cover operably engaged with the support and enclosing the slide; and
- a firing pin mechanism operably engaged with the support, the slide, and the cover and moveable in a second direction relative to the slide and the support;
- wherein the second direction is different than the first direction;
- wherein the cavity is configured to receive the slide; and
- wherein the projection is configured to receive the firing pin mechanism and to be received by the slide.

2. The switch assembly of claim 1, wherein the firing pin mechanism is provided in a loaded position when the slide is provided in the primed position; and
- wherein the firing pin mechanism is provided in a fired position.

3. The switch assembly of claim 1, wherein the slide comprises:
- a first end;
- a second end opposite to the first end;
- a longitudinal axis extending between the first end and the second end; and
- a passage defined between the first end and the second end extending along an axis that is perpendicular to the longitudinal axis;
- wherein the passage is configured to receive the projection to enable the slide to move between the primed position and the released position.

4. The switch assembly of claim 3, wherein the slide further comprises:
- a circumferential wall defining the passage;
- at least one shelf extending into the passage from the circumferential wall; and
- wherein the support further comprises:
- at least one slit defined in the projection configured to receive the at least one shelf of the slide.

5. The switch assembly of claim 4, wherein the at least one shelf is positioned inside of the at least one slit when the slide is provided in the primed position; and
- wherein the at least one shelf is positioned outside of the at least one slit when the slide is provided in the released position.

6. The switch assembly of claim 4, wherein the firing pin mechanism comprises:
a plunger positioned inside of the projection; and
a biaser operably engaged with the plunger and the cover;
wherein the plunger and the biaser are provided in a loaded position when the plunger operably engages with the at least one shelf when the slide in provided in the primed position; and
wherein the plunger and the biaser are provided in a fired position when the plunger operably disengages from the at least one shelf when the slide in provided in the released position.

7. The switch assembly of claim 3, wherein the slide further comprises:
at least one chamber extending from the first end towards the second end along the longitudinal axis;
wherein the at least one chamber is separate from the passageway.

8. The switch assembly of claim 7, further comprising:
at least one biaser operably engaged with the slide inside of the at least one chamber and operably engaged with the support inside of the cavity;
wherein the at least one biaser is configured to move the slide in the first direction from the primed position to the released position when the slide is free from engaging a vehicle.

9. The switch assembly of claim 8, further comprising:
a retaining member operably engaging the slide and the support with one another;
wherein the retaining member maintains the slide at the primed position inside of the cavity of the support.

10. The switch assembly of claim 6, wherein the cover comprises:
a top surface;
a bottom surface opposite to the top surface; and
a cap extending vertically from the top surface and away from the bottom surface;
wherein the cap is configured to receive and engage a portion of the biaser of the firing pin mechanism for maintaining the firing pin mechanism in the loaded position when the slide is provided in the primed position.

11. The switch assembly of claim 10, wherein the cover further comprises:
a first set of apertures defined in the cover extending entirely through the cover between the top surface and the bottom surface; and
wherein the support further comprises:
a first set of openings defined in the support extending into the support from the first surface towards the second surface; and
wherein the switch assembly further comprises:
a first set of connectors operably engaging the cover and the support with one another via the first set of apertures and the first set of openings.

12. The switch assembly of claim 11, wherein the cover further comprises:
a second set of apertures defined in the cover extending entirely through the cover between the first surface and the second surface; and
wherein the support further comprises:
a second set of openings defined in the support extending into the support from the first surface towards the second surface; and
wherein the switch assembly further comprises:
a second set of connectors adapted to operably engage the cover and the support with the battery via the second set of apertures and the second set of openings.

13. A method of effecting a battery to initiate, comprising:
engaging a slide of a switch assembly with a support of the switch assembly;
loading a firing pin mechanism of the switch assembly into a projection of the support;
engaging a cover of the switch assembly with the support;
effecting the switch assembly to be loaded into a vehicle, wherein the slide is provided in a primed position and the firing pin mechanism is provided in a loaded position;
effecting the slide to transition from the primed position to a released position;
effecting the firing pin mechanism to transition from the loaded position to a fired position;
positioning at least one shelf of the slide inside at least one slit defined by a projection of the support; and
engaging a plunger of the firing pin mechanism with the at least one shelf to maintain the firing pin mechanism at the loaded position.

14. The method of claim 13, further comprising:
effecting a first set of connectors to operably engage the cover and the support with one another via a first set of apertures defined in the cover and a first set of openings defined in the support; and
effecting a second set of connectors to operably engage the cover and the support with the battery via a second set of apertures defined in the cover and a second set of openings defined in the support.

15. The method of claim 13, further comprising:
engaging a biaser of the firing pin mechanism with the plunger and the cover.

16. The method of claim 15, further comprising:
effecting a retaining member of the switch assembly to engage the slide and the support with one another prior to the switch assembly being loaded into a vehicle.

17. The method of claim 16, further comprising:
effecting a retaining member of the switch assembly to disengage the slide and the support from one another subsequent to the switch assembly being loaded into the vehicle.

18. The method of claim 17, wherein the switch assembly further comprises a plurality of biasers and further comprising:
moving the slide away from the support, via at least one biaser of the switch assembly, from the primed position to the released position;
removing the at least one shelf of the slide from the at least one slit of the projection;
disengaging the plunger from the at least one shelf; and
moving the plunger away from the slide and the support, via the biaser of the firing pin mechanism, from the loaded position to the fired position.

* * * * *